(12) United States Patent
Mori et al.

(10) Patent No.: US 7,648,160 B2
(45) Date of Patent: Jan. 19, 2010

(54) AIR BAG DEVICE FOR REAR-END COLLISION MOUNTED ON VEHICLE

(75) Inventors: Kenji Mori, Aichi-ken (JP); Masakazu Hashimoto, Aichi-ken (JP); Hiroyuki Kobayashi, Aichi-ken (JP); Naoki Hotta, Aichi-ken (JP); Shinji Oguchi, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/076,019

(22) Filed: Mar. 13, 2008

(65) Prior Publication Data

US 2008/0174092 A1 Jul. 24, 2008

Related U.S. Application Data

(62) Division of application No. 10/627,984, filed on Jul. 28, 2003, now Pat. No. 7,364,185.

(30) Foreign Application Priority Data

| Jul. 29, 2002 | (JP) | ............................. 2002-220325 |
| Jul. 29, 2002 | (JP) | ............................. 2002-220326 |
| Jul. 29, 2002 | (JP) | ............................. 2002-220327 |
| Oct. 21, 2002 | (JP) | ............................. 2002-306219 |
| May 14, 2003 | (JP) | ............................. 2003-136535 |

(51) Int. Cl.
  *B60R 21/16* (2006.01)
(52) U.S. Cl. .................................................. 280/730.1
(58) Field of Classification Search ............... 280/730.1
  See application file for complete search history.

(56) References Cited

U.S. PATENT DOCUMENTS

| 2,834,606 | A | 5/1958 | Bertrand |
| 3,510,150 | A | 5/1970 | Wilfert |

(Continued)

FOREIGN PATENT DOCUMENTS

DE          4426733 A1       2/1995

(Continued)

OTHER PUBLICATIONS

Office Action from Japanese Patent Office issued on Mar. 13, 2007 for the corresponding Japanese patent application No. 2003-136535.
Office Action from Japanese Patent Office issued on Apr. 3, 2007 for the corresponding Japanese patent application No. 2002-220327.

(Continued)

*Primary Examiner*—Eric Culbreth
(74) *Attorney, Agent, or Firm*—Posz Law Group, PLC

(57) ABSTRACT

A vehicle includes an air bag device for an occupant seated in a rearmost seat. The air bag device includes an air bag, which is accommodated at the rear end portion of the roof of the vehicle in a folded state, and an inflator, which supplies gas to the air bag. The air bag is unfolded downward to be inflated between the rearmost seat and a rear window glass. The air bag device has several functions to effectively protect an occupant seated in the rearmost seat, such as a function to apply a predetermined tension to the inflated air bag, a function to properly restrict the thickness of the air bag, and a function to properly control the unfolding direction of the air bag.

5 Claims, 20 Drawing Sheets

U.S. PATENT DOCUMENTS

| | | | |
|---|---|---|---|
| 3,525,535 | A | 8/1970 | Kobori |
| 3,703,313 | A | 11/1972 | Schesterl et al. |
| 5,738,407 | A | 4/1998 | Locke |
| 6,095,550 | A | 8/2000 | O'Loughlin et al. |
| 6,113,132 | A | 9/2000 | Saslecov |
| 6,168,190 | B1 | 1/2001 | Bowers et al. |
| 6,186,544 | B1 | 2/2001 | Igawa |
| 6,196,576 | B1 | 3/2001 | Sutherland et al. |
| 6,572,137 | B2 | 6/2003 | Bossecker et al. |
| 6,676,154 | B2 | 1/2004 | Fischer |
| 6,688,641 | B2 | 2/2004 | Dominissini |
| 6,783,152 | B2 | 8/2004 | Tanase et al. |
| 6,848,708 | B2 | 2/2005 | Green et al. |
| 2004/0239084 | A1 | 12/2004 | Mori et al. |
| 2006/0055153 | A1 | 3/2006 | Hirata |
| 2006/0097491 | A1 | 5/2006 | Saberan et al. |
| 2006/0138754 | A1 | 6/2006 | Hirata et al. |
| 2006/0214401 | A1 | 9/2006 | Hirata |

FOREIGN PATENT DOCUMENTS

| | | |
|---|---|---|
| DE | 10042591 | 4/2001 |
| DE | 10039810 A1 | 2/2002 |
| DE | 10056298 A1 | 5/2002 |
| DE | 10115064 | 11/2002 |
| EP | 1 110 825 A1 | 6/2001 |
| EP | 1 264 742 A2 | 12/2002 |
| JP | A-S48-88627 | 11/1973 |
| JP | 49-038335 | 4/1974 |
| JP | A-49-139106 | 11/1974 |
| JP | U-S64-7054 | 1/1989 |
| JP | 03-276844 | 12/1991 |
| JP | A-H05-85290 | 4/1993 |
| JP | 06-080057 | 3/1994 |
| JP | A-H06-65117 | 9/1994 |
| JP | A-07-20896 | 4/1995 |
| JP | A-07-117605 | 5/1995 |
| JP | A-H07-186870 | 7/1995 |
| JP | 09-109825 | 4/1997 |
| JP | 09-175316 | 7/1997 |
| JP | A-H09-249089 | 9/1997 |
| JP | A-10-086785 | 4/1998 |
| JP | A-H11-048902 | 2/1999 |
| JP | A-11-222037 | 8/1999 |
| JP | 11-321538 | 11/1999 |
| JP | A-H11-334439 | 12/1999 |
| JP | A-2000-168483 | 6/2000 |
| JP | A-2001-505160 | 4/2001 |
| JP | 2001-270413 | 10/2001 |
| JP | A-2001-287618 | 10/2001 |
| JP | A-2002-104126 | 4/2002 |
| WO | WO 98/24661 | 6/1998 |

OTHER PUBLICATIONS

Office Communication issued from European Patent Office issued on Dec. 23, 2005 for the corresponding European patent application No. 03017108.6-2421.

Office Communication issued from Japanese Patent Office issued on Dec. 13, 2006 for the corresponding Japanese patent application No. JP-2002-220327.

Office Action from Japanese Patent Office issued on Jan. 5, 2007 for the corresponding Japanese patent application No. 2002-220326.

Office Action issued from Japanese Patent Office dated Jul. 6, 2007 for JP2003-136535.

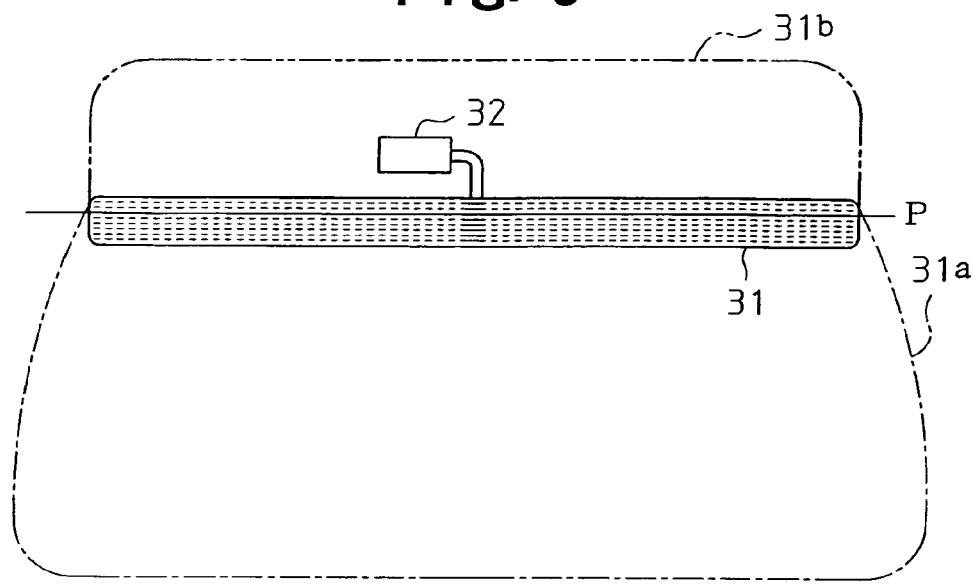
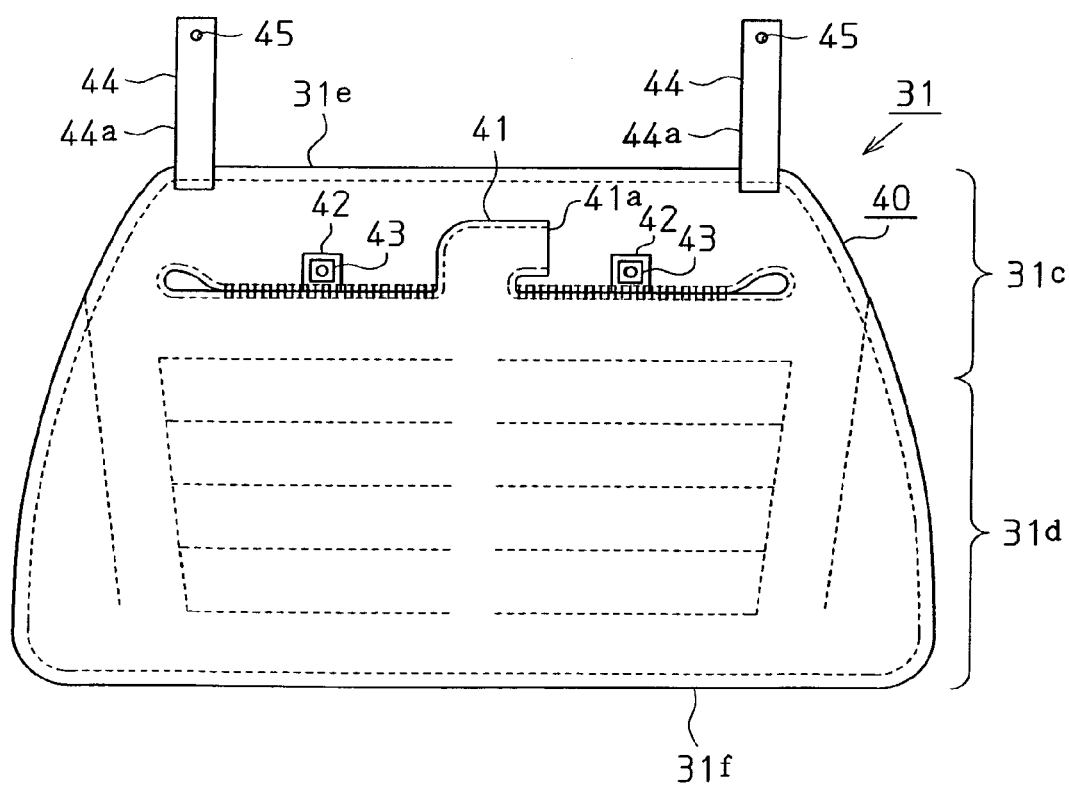

Fig. 33
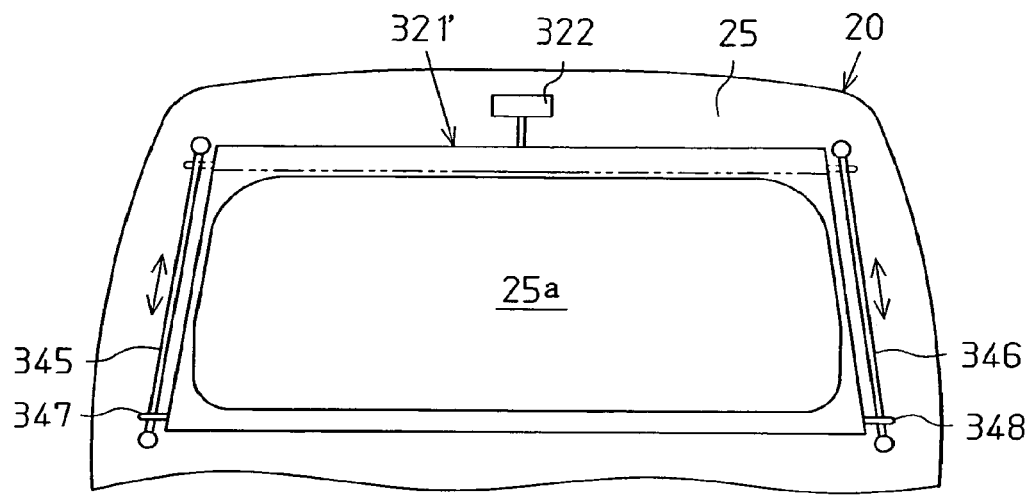
Fig. 34 (a)    Fig. 34 (b)
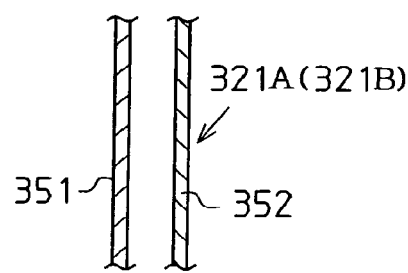
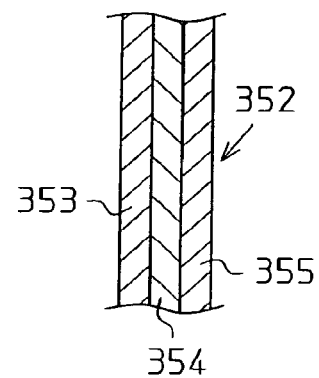

AIR BAG DEVICE FOR REAR-END COLLISION MOUNTED ON VEHICLE

BACKGROUND OF THE INVENTION

The present invention relates to an occupant protecting device and an air bag device for a rear-end collision used for protecting an occupant in a back seat of a vehicle from an impact applied to a rear portion of the vehicle.

An air bag device is disclosed in Japanese Laid-Open Utility Model Publication No. 6-65117. The air bag device of the publication includes a sensor for detecting the acceleration applied to a rearmost seat of a vehicle and an air bag accommodated inside the rearmost seat in a folded state. When the sensor detects an acceleration exerted rearward of the vehicle, the air bag is instantly deployed to absorb impact on an occupant seated in the rearmost seat.

Air bag devices have also been proposed other than the air bag device that is mentioned above. In Japanese Laid-Open Utility Model Publication 64-7054, the air bag device that is deployed as described above is accommodated below a trunk, which is located at the rear of the rearmost seat. In Japanese Laid-Open Patent Publication No. 7-186870, the air bag device that is deployed as described above is accommodated below a rear package tray, which its located at the rear of the rearmost seat.

In the air bag device of the above publication No. 6-65117, since a relatively bulky air bag is accommodated inside the seat, the seat becomes less comfortable. In the air bag devices of the publications No. 64-7054 and No. 7-186870, it is required that, to avoid hindering deployment of the air bag, baggage must not be placed in the trunk or on the rear package tray. This reduces convenience.

The air bag devices disclosed in the above publications are formed without considering the predicted movement of the occupant at the collision of the vehicle. For example, when a severe impact is applied to the rear of the vehicle, the occupant seated in the rearmost seat might move rearward along the backrest of the seat. However, the air bag devices are not formed predicting such cases. Thus, the rearward movement of the occupant cannot be prevented sufficiently. When vehicles collide in a state offset in the left or right direction from the traveling direction, the occupant moves in the left or right direction and might hit a rear pillar in the passenger compartment. Depending on the condition of collision, the occupants in the rearmost seat might collide against each other.

In addition, in the air bag devices of the above publications, if the air bag is deployed between the rearmost seat and the rear window glass when, for example, the occupant's head is displaced rearward from the headrest of the rearmost seat, the air bag interferes with the occupant's head. Thus, the air bag is hindered from being deployed in a proper manner.

In an air bag device disclosed in Japanese Laid-Open Patent Publication No. 5-85290, an air bag is accommodated in a rear ceiling of a vehicle in a folded state. When an impact is applied from the rear of the vehicle, inflation gas is supplied to the air bag from an inflator so that the air bag is deployed between the rearmost seat and the rear window glass. However, the air bag only rounds out in the vicinity of the ceiling. Thus, the impact applied to the occupant seated in the rearmost seat is not sufficiently absorbed.

To solve the above problem, a large air bag may be used and the amount of the inflation gas supplied from the inflator may be increased to inflate the air bag in a large size. However, in this case, a large inflator needs to be used, which increases cost of the air bag device.

SUMMARY OF THE INVENTION

Accordingly, it is an objective of the present invention to provide an occupant protecting device and an air bag device for rear-end collision mounted on a vehicle that effectively protects an occupant seated in a back seat.

A further objective of the present invention is to provide an occupant protecting device and an air bag device for rear-end collision mounted on a vehicle that prevents deterioration of seat comfortableness and prevents deterioration of convenience of a vehicle.

To achieve the above objectives, the present invention provides an air bag device for an occupant seated in a rearmost seat of a vehicle. The vehicle has a rear roof rail and a rear window glass. The air bag device includes an air bag and an inflator. The air bag is accommodated in an upper rear end portion of the vehicle in a folded state. The inflator supplies gas to the air bag to deploy the air bag. The air bag has a portion that is unfolded downward to be inflated between the rearmost seat and the rear window glass and a portion that is deployed to cover the rear roof rail.

A further aspect of the present invention is an air bag device for an occupant seated in a rearmost seat of a vehicle. The vehicle has a rear window glass and a pair of rear pillars, with a rear pillar being located on each side of the rear window glass. The air bag device includes an air bag and an inflator. The air bag is accommodated in an upper rear end portion of the vehicle in a folded state. The inflator supplies gas to the air bag to deploy the air bag. The air bag has a portion that is unfolded downward to be inflated between the rearmost seat and the rear window glass and a portion that is deployed to cover the rear pillars.

The present invention also provides an air bag device for occupants seated in rearmost seats of a vehicle. The air bag device includes an air bag and an inflator. The air bag is accommodated in an upper rear end portion of the vehicle in a folded state. The inflator supplies gas to the air bag to deploy the air bag. The air bag has a portion that is unfolded downward to be inflated between the rearmost seats and a rear window glass of the vehicle and a portion that is inflated between the rearmost seats.

The present invention also provides a device for protecting an occupant seated in a rearmost seat of a vehicle. The device includes an impact determining device and a movement restricting mechanism. The impact determining device determines that an impact has been applied to the vehicle or that there is a possibility that an impact will be applied to the vehicle. The movement restricting mechanism functions to restrict the rearward movement of the occupant seated in the rearmost seat based on the determination result of the impact determining device.

The present invention also provides an air bag device for an occupant seated in a rearmost seat of a vehicle. The air bag device includes an air bag, an inflator, and a thickness restricting mechanism. The air bag has an upper bag portion and a lower bag portion. The inflator supplies gas to the air bag to deploy the air bag between the rearmost seat and a rear window glass of the vehicle. The thickness restricting mechanism restricts the thickness of the air bag such that, when the air bag is deployed, the thickness of the upper bag portion is greater than the thickness of the lower bag portion in the front and rear direction of the vehicle.

The present invention also provides an air bag device for an occupant seated in a rearmost seat of a vehicle. The air bag device includes an air bag, an inflator, and side rigid portions. The inflator supplies gas to the air bag to deploy the air bag between the rearmost seat and a rear window glass of the vehicle. The side rigid portions extend in the vertical direction at the left and right sides of the air bag to improve the rigidity of the air bag when the air bag is deployed.

The present invention also provides an air bag device for an occupant seated in a rearmost seat of a vehicle. The air bag device includes an air bag, an inflator, and an unfolding direction controlling mechanism. The air bag is accommodated in an upper rear end portion of the vehicle in a folded state when the air bag not deployed. The inflator supplies gas to the air bag. When the gas is supplied to the air bag, the air bag is unfolded downward to be inflated between the rearmost seat and a rear window glass of the vehicle. The unfolding direction controlling mechanism controls the unfolding direction of the air bag such that the air bag is unfolded along the rear window glass.

The present invention also provides an air bag device for an occupant seated in a rearmost seat of a vehicle. The air bag device includes an air bag, an inflator, and a moving mechanism. The air bag is accommodated in an upper rear end portion of the vehicle in a folded state when the air bag not deployed. The inflator supplies gas to the air bag. When the gas is supplied to the air bag, the air bag is unfolded downward to be inflated between the rearmost seat and a rear window glass of the vehicle. When the air bag is started to be unfolded or before the air bag is unfolded, the moving mechanism moves at least the head of the occupant seated in the rearmost seat toward the front of the vehicle.

The present invention also provides an air bag device for an occupant seated in a rearmost seat of a vehicle. The air bag device includes an air bag and an inflator. The inflator supplies gas to the air bag to deploy the air bag between the rearmost seat and a rear window glass of the vehicle. The air bag can be unfolded along the rear window glass in a non-inflated state to be used as a sun shade.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a front view illustrating the air bag and the inflator shown in FIG. 1;

FIG. 6 is a front view illustrating an air bag according to a second embodiment of the present invention;

FIG. 33 is a schematic front view illustrating an air bag device according to a modified example of the fifth embodiment;

FIG. 34(*a*) is a partial cross-sectional view illustrating an air bag according to a modified example of the fifth embodiment;

FIG. 34(*b*) is a partial cross-sectional view illustrating an air bag according to a modified example of the fifth embodiment;

FIG. 36(b) is a side view illustrating a seat according to a modified example of the sixth embodiment.

DETAILED DESCRIPTION OF THE PREFERRED EMBODIMENTS

An air bag device 30 for rear-end collision according to a first embodiment of the present invention will now be described with reference to FIGS. 1 to 5.

Figure 3:
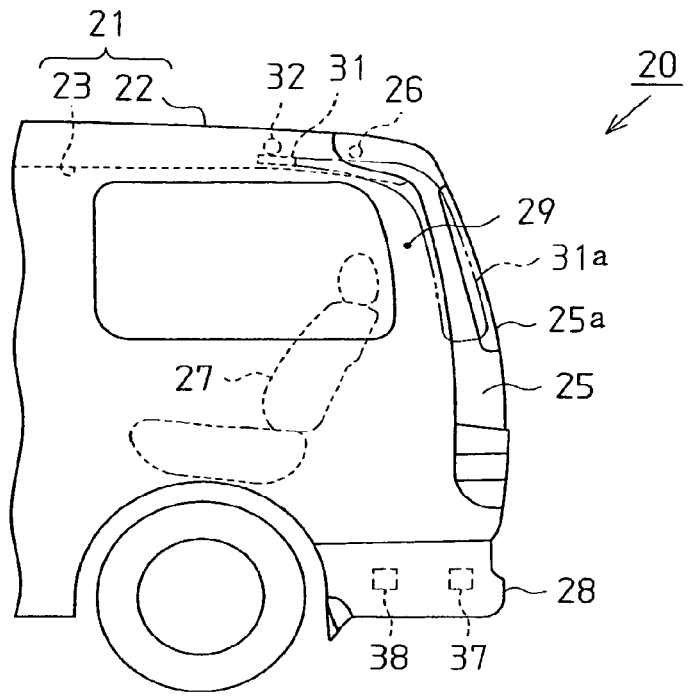
FIG. 3 is a side view illustrating a rear portion of a vehicle that has the air bag device shown in FIG. 1.
Figure 4:
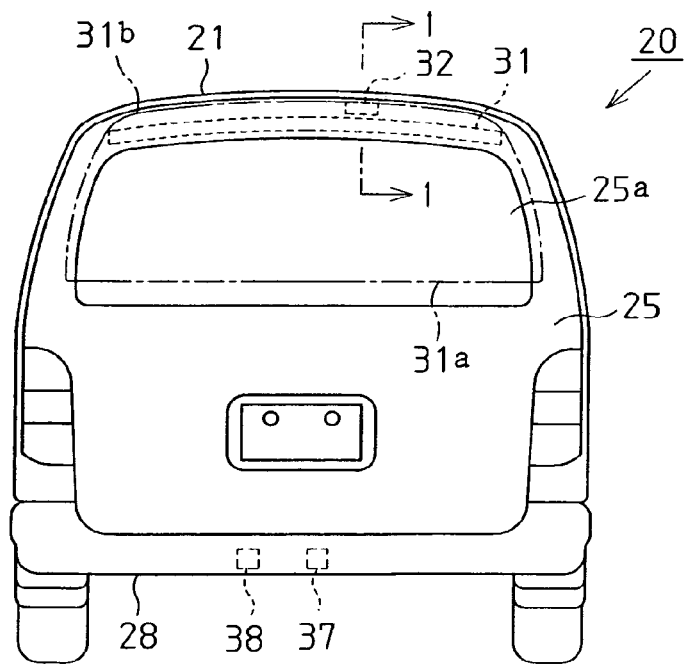
FIG. 4 is a rear view of the vehicle shown in FIG. 3.

FIGS. 3 and 4 show a vehicle 20, which has the air bag device 30 of the first embodiment. The vehicle 20 has several seats arranged along the front and rear direction of the vehicle 20. FIG. 3 shows a rearmost seat 27 among the seats. The air bag device 30 of the first embodiment is suitable for the vehicle 20 as shown in FIGS. 3 and 4. That is, the air bag device 30 of the first embodiment is suitable for a vehicle in which the distance between a rear bumper 28 and the rearmost seat 27 is relatively short and the rear end of a roof 21 is located at the rear of the rearmost seat 27, such as a minivan or a hatchback.

Figure 1:
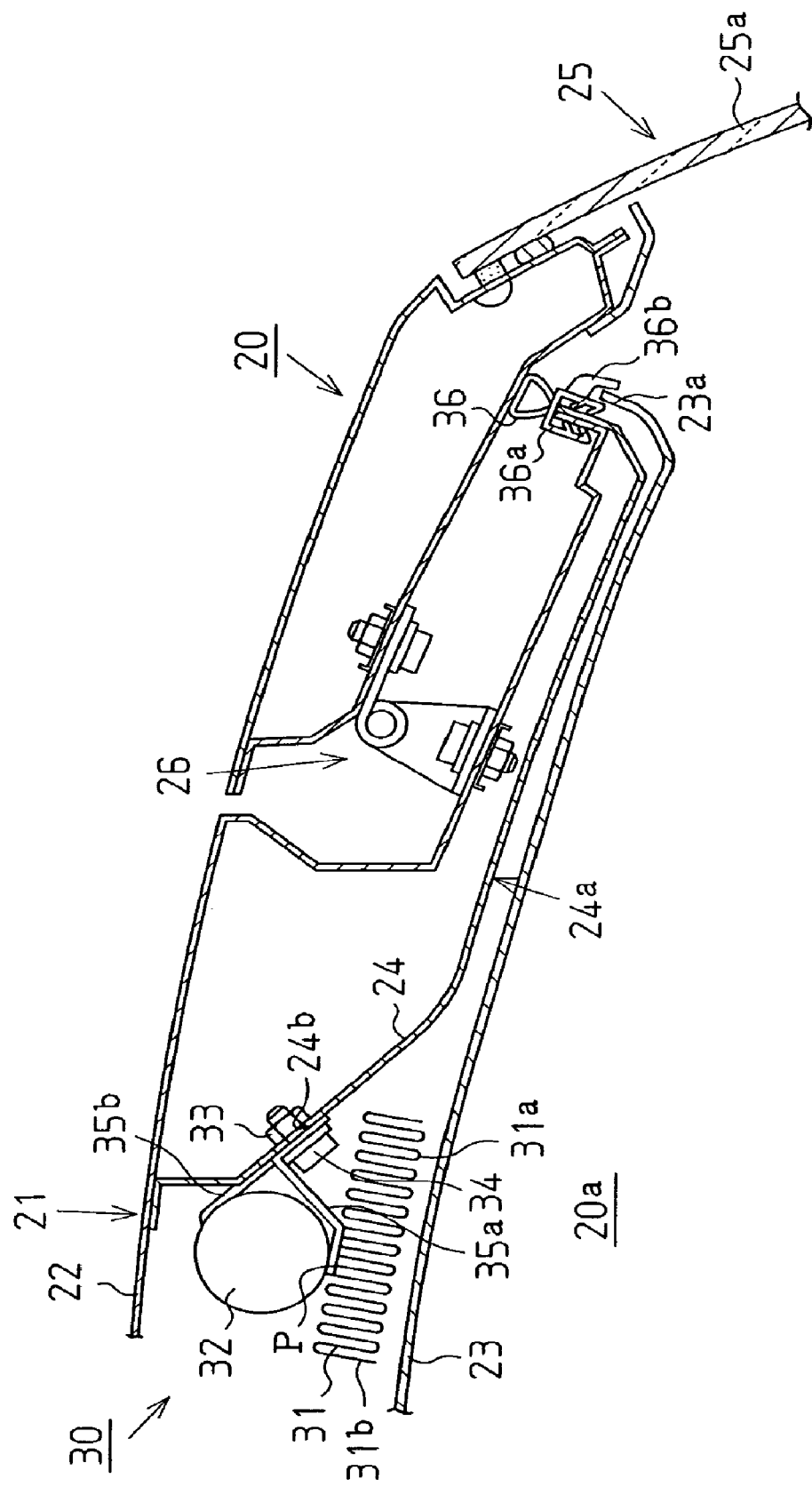
FIG. 1 is an enlarged cross-sectional view illustrating an air bag device according to a first embodiment of the present invention taken along line 1-1 in FIG. 4.

The roof 21 of the vehicle 20 shown in FIG. 3 includes an exterior member, which is a roof panel 22 in the first embodiment, an ornamental member, which is a roof headlining 23 in the first embodiment, and an inner panel 24, which are shown in FIG. 1 in detail. The roof headlining 23 is formed of flexible material, such as synthetic resin. The roof headlining 23 covers the entire inner surface of the roof panel 22 located on the side of a passenger compartment 20a. The inner panel 24 is located between the roof panel 22 and the roof headlining 23. The inner panel 24 forms a hollow rear roof rail 24a with the roof panel 22. A rear door 25 is attached to the rear end of the roof panel 22 with a hinge mechanism 26 to be selectively opened and closed. A rear window glass 25a is attached to the rear door 25.

As shown in FIGS. 1 and 3, an air bag 31 and an inflator 32, which supplies inflation gas to the air bag 31, are located at the end of the roof 21 located at the rear side of the vehicle 20, that is, at the rear end of the roof 21.

Mounting holes 24b (only one is shown in FIG. 1) are formed at the front end of the inner panel 24, which is located at the rear side of the vehicle 20. Mounting nuts 33 are welded on the inner panel 24. Each mounting nut 33 corresponds to one of the mounting holes 24b. The mounting nuts 33 are used to mount the air bag 31 and the inflator 32 to the roof 21. The rear roof rail 24a has a relatively high rigidity such that the rear roof rail 24a does not deform when an impact is applied from the rear of the vehicle 20. Thus, in the first embodiment, the air bag 31 and the inflator 32 are secured to the inner panel 24, which has high rigidity, with the mounting nuts 33.

As shown in FIG. 1, two brackets 35a, 35b are mounted to the inner panel 24 with mounting bolts 34. Each mounting bolt 34 is screwed to one of the mounting nuts 33 through the corresponding mounting hole 24b. The middle portion P of the air bag 31 in the front and rear direction (left and right direction as viewed in FIG. 1) of the vehicle 20 is coupled to one bracket 35a by, for example, calking. The inflator 32 is mounted to the other bracket 35b. The air bag 31 is substantially rectangular when inflated (as shown by a dashed line in FIG. 5) but is folded (as shown by a solid line in FIG. 5) when mounted to the vehicle 20. The bracket 35a extends along the width direction of the vehicle 20. The middle portion P (the middle portion in the vertical direction as viewed in FIG. 5) of the unfolded air bag 31 is coupled to the distal rim of the bracket 35a. The middle portion P, or the coupling point P, forms a division between a door side unfolding portion 31a and a roof side unfolding portion 31b of the air bag 31. The air bag 31 and the inflator 32 are accommodated between the roof headlining 23 and the inner panel 24. Since it is easy to form a relatively large inner space between the roof headlining 23 and the inner panel 24, the inner space is suitable to be used as an accommodating space of the air bag 31 and the inflator 32.

The roof headlining 23 has a rear end 23a, which is located at the rear side of the vehicle and contacts the inner panel 24. A frame 36a is attached to the rear end of the inner panel 24. The frame 36a supports a weather strip 36, which seals a space between the rear roof rail 24a and the rear door 25. A covering piece 36b, which is attached to the frame 36a, covers the rear end 23a of the roof headlining 23. The roof headlining 23 deforms to separate downward from the inner panel 24 when the air bag 31 is deployed. Therefore, a space having a predetermined capacity is formed between the roof headlining 23 and the inner panel 24 (see FIG. 2).

Figure 2:
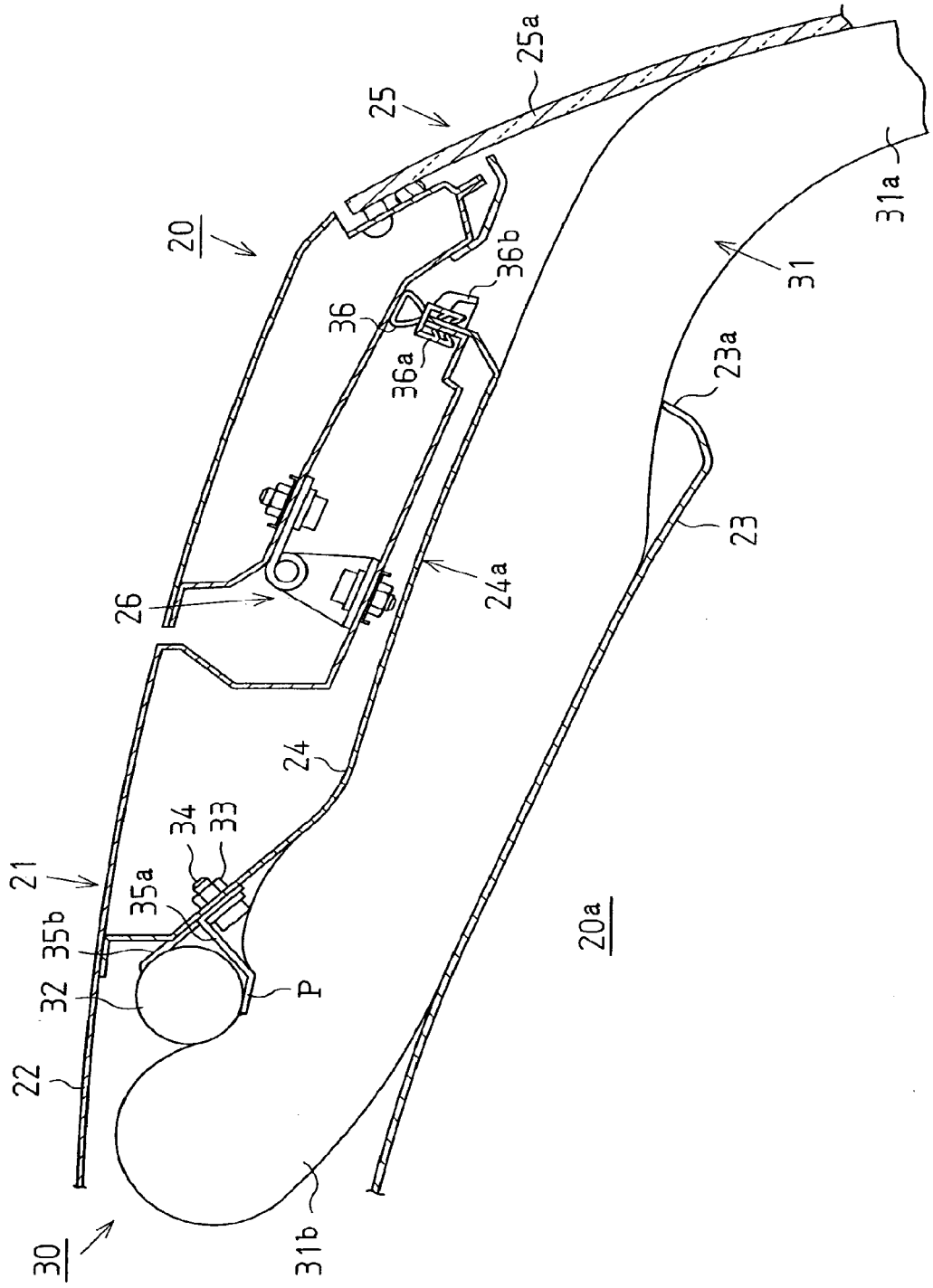
FIG. 2 is an enlarged cross-sectional view illustrating a state in which the air bag of FIG. 1 is deployed.

As shown in FIG. 2, when the air bag 31 is inflated, the air bag 31 is unfolded in two opposing directions from the coupling point P, which is coupled to the bracket 35a. That is, when the air bag 31 is inflated, the air bag 31 is unfolded in a direction toward the rear end 23a of the roof headlining 23 and a direction toward the front of the vehicle 20. The door side unfolding portion 31a is unfolded to partition between the rear window glass 25a and the rearmost seat 27 as shown by a chain-double dashed line FIG. 3. In the first embodiment, the air bag 31 is unfolded along the rear window glass 25a to cover the rear window glass 25a.

As shown in FIG. 3, an impact sensor 37 is located in the vicinity of the rear bumper 28 of the vehicle 20. The impact sensor 37 functions as an impact determining device and sends out a detection signal when an impact that is greater than or equal to a predetermined value is applied to the vehicle 20 from the rear of the vehicle 20. The air bag device 30 of the first embodiment includes an electronic control unit 38 formed by, for example, a microcomputer. The electronic control unit 38 determines that an impact is applied to the vehicle 20 based on the output signal from the impact sensor 37, and sends an actuation signal to the inflator 32.

The inflator 32 supplies inflation gas into the air bag 31 based on the actuation signal from the electronic control unit 38, and deploys the air bag 31. More specifically, the door side unfolding portion 31a of the air bag 31 is unfolded along the rear roof rail 24a while pushing aside the roof headlining 23, and projects inside the passenger compartment 20a from inside of the roof 21. Accordingly, the door side unfolding portion 31a separates the rear window glass 25a from an occupant seated in the rearmost seat 27. The deployed door side unfolding portion 31a reduces damages to the inside of the passenger compartment 20a caused by scattered objects from the rear of the vehicle 20, and absorbs impact applied to the rear of the vehicle 20.

Part of the door side unfolding portion 31a is inflated between the roof headlining 23 and the rear roof rail 24a. Therefore, as shown in FIG. 2, the roof headlining 23 receives a force in a direction to separate from the inner panel 24 by the inflated door side unfolding portion 31a. This force causes the rear end 23a of the roof headlining 23 to separate from the covering piece 36b, and the roof headlining 23 to separate downward from the inner panel 24. Therefore, the door side unfolding portion 31a forms a cushion having sufficient thickness between the roof headlining 23 and the rear roof rail 24a. Further, the roof side unfolding portion 31b of the air bag 31 is unfolded forward of the vehicle 20 from the coupling point P, which is coupled to the bracket 35a. Therefore, a cushion having sufficient thickness is also formed between the roof headlining 23 and the front portion of the rear roof rail 24a by the roof side unfolding portion 31b. Thus, even if an occupant seated in the rearmost seat 27 without wearing a seat belt is guided by the backrest of the seat 27 and moves upward, and the head of the occupant contacts the roof headlining 23 located below the rear roof rail 24a, the cushion reduces the impact applied to the head of the occupant.

The first embodiment provides the following advantages.

The air bag 31 is mounted to the end of the roof 21 on the rear side of the vehicle 2b. Therefore, the air bag device need not be incorporated inside the rearmost seat 27 and the air bag device does not limit the use of a trunk of the vehicle 20. Thus, the comfortableness of the seat and the convenience of the vehicle are prevented from being deteriorated.

The air bag 31 is secured to the roof 21, which deforms only a little when an impact is applied from the rear of the vehicle 20. Therefore, the air bag 31 is prevented from being hindered to be unfolded, and the unfolding direction is prevented from being changed unnecessarily. Thus, the air bag device 30 for rear-end collision is reliably operated, and the air bag 31 is reliably unfolded in a desired state.

The air bag 31 and the inflator 32 are accommodated in the roof 21. Therefore, the space for accommodating the air bag 31 and the inflator 32 is easily and reliably obtained. Further, since the air bag 31 and the inflator 32 are accommodated between the roof headlining 23 and the inner panel 24, the air bag 31 and the inflator 32 are covered by the roof headlining 23, which improves the appearance.

The door side unfolding portion 31a of the air bag 31 is inflated to cover the rear roof rail 24a. Therefore, even if an occupant seated in the rearmost seat 27 without wearing a seat belt is lifted upward along the backrest, and moved toward the rear roof rail 24a, which has high rigidity, the inflated air bag 31 reduces impact caused by collision. Further, since the roof side unfolding portion 31b of the air bag 31 is formed, the air bag 31 having sufficient thickness is arranged in the vicinity of the front end of the rear roof rail 24a. This further improves the shock absorption efficiency of the air bag 31.

The air bag 31 is unfolded to partition between the rear window glass 25a and the rearmost seat 27. Therefore, when an impact is applied to the rear of the vehicle 20, the rear window glass 25a and the occupant seated in the rearmost seat 27 are separated by the air bag 31. This also reduces damages to the inside of the passenger compartment 20a caused by, for example, scattered objects from the rear of the vehicle 20. The air bag device 30 for rear-end collision of the first embodiment is particularly effective on the vehicle 20 that has a short distance between the rearmost seat 27 and the rear bumper 28.

A second embodiment of the present invention will now be described. The differences from the first embodiment of FIGS. 1 to 5 are mainly discussed below with reference to FIGS. 6 to 9. In the second embodiment, the structure of the air bag 31 and the securing structure of the air bag 31 to the vehicle 20 are different from the first embodiment.

As shown in FIG. 6, the air bag 31 is formed by, for example, a ground fabric 40 woven into a bag form. The air bag 31 is substantially rectangular when the ground fabric 40 is unfolded in a planar form. The air bag 31 includes a connecting portion 41, which has a supply port 41a. The inflator 32 is connected to the supply port 41a via, for example, a gas supply pipe (not shown) made of aluminum. In FIG. 6, a dotted line on the air bag 31 indicates seams. The state of the seams is not limited to the state shown in FIG. 6, but may be changed in accordance with the size and shape of the air bag 31.

A pair of mounting pieces 42 is formed on the air bag 31 in the vicinity of the connecting portion 41. The air bag 31 is attached to the roof 21 of the vehicle 20 using the mounting pieces 42. The mounting pieces 42 are formed integrally with the ground fabric 40. A securing fitting 43 is attached to each mounting piece 42. A through hole is formed in each fitting 43 and each mounting piece 42.

The air bag 31 has a roof side inflation portion 31c and a passenger compartment side inflation portion 31d. The roof side inflation portion 31c is inflated in a space between the roof panel 22 and the roof headlining 23 of the vehicle 20 when gas is supplied from the inflator 32. The passenger compartment side inflation portion 31d is inflated to appear inside the passenger compartment 20a when gas is supplied from the inflator 32. The roof side inflation portion 31c corresponds to the upper portion of the air bag 31 and the passenger compartment side inflation portion 31d corresponds to the lower portion of the air bag 31. More specifically, the roof side inflation portion 31c corresponds to a portion of the air bag 31 from the upper rim 31e of the inflated air bag 31 to the region slightly closer to the lower rim 31f of the air bag 31 than the mounting pieces 42. The passenger compartment side inflation portion 31d corresponds to a portion of the air bag 31 from the region slightly closer to the lower rim 31f than the mounting pieces 42 to the lower rim 31f.

A pair of securing portions 44 is attached to the roof side inflation portion 31c for securing the air bag 31 to the vehicle 20. Each securing portion 44 includes a securing belt 44a having a predetermined length. Each securing belt 44a is formed by, for example, cloth made of the same fabric as the ground fabric 40, which forms the air bag 31. The securing belts 44a are located in the vicinity of the upper rim 31e of the air bag 31 on both end portions in the width direction. The proximal end of each securing belt 44a is sewed to the ground fabric 40. A small diameter clip hole 45 is formed at the distal end of each securing belt 44a.

A securing structure of the air bag 31 will now be described.

Figure 7:
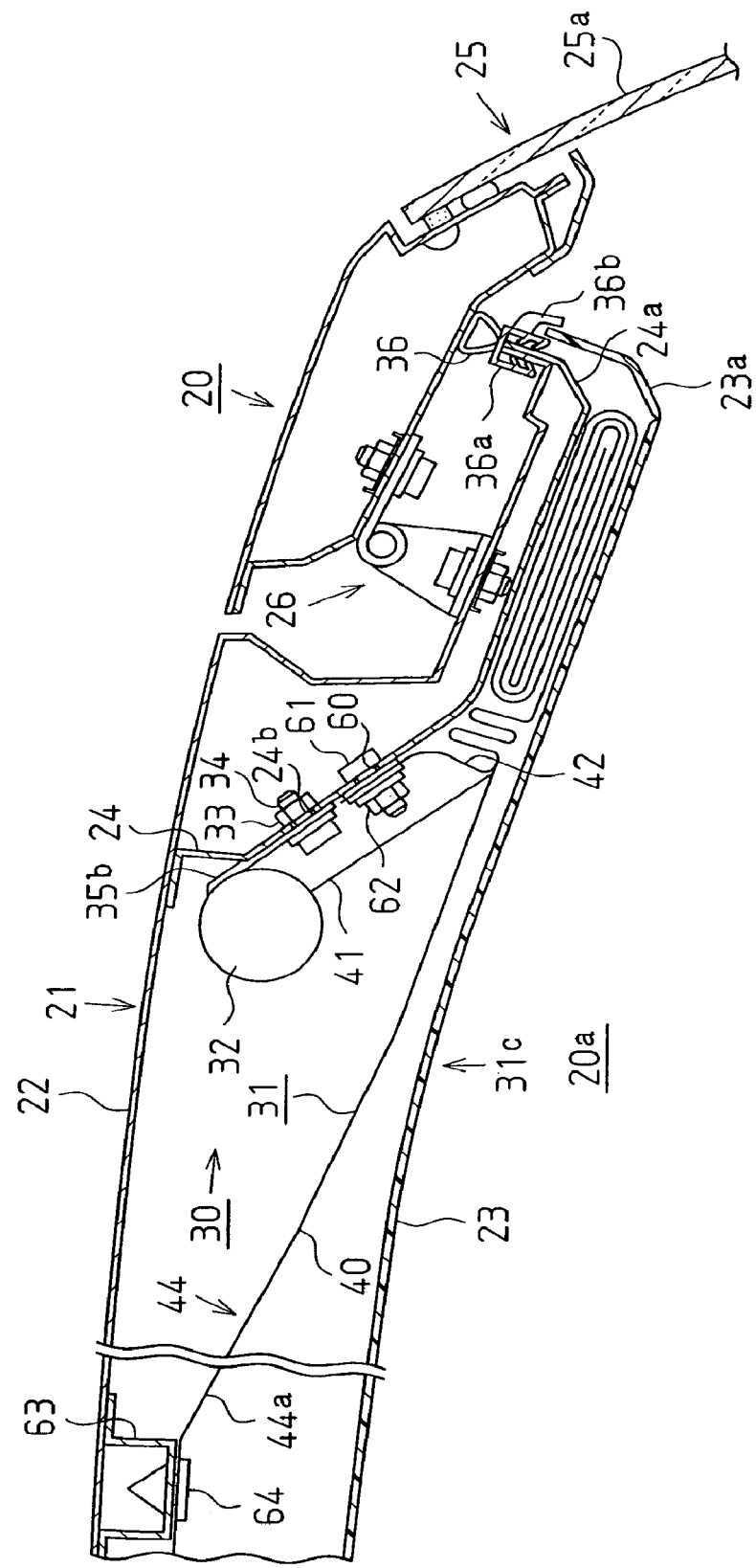
FIG. 7 is an enlarged cross-sectional view illustrating the rear portion of the vehicle showing the air bag of FIG. 6 before being inflated.

As shown in FIG. 7, the inner panel 24 has a pair of insertion holes 60. Each insertion hole 60 corresponds to one of the mounting pieces 42 of the air bag 31. A securing bolt 61 is inserted into each insertion hole 60 from the interior of the rear roof rail 24a toward the passenger compartment 20a, and welded to the inner panel 24. A securing nut 62 is screwed to each securing bolt 61 while the securing bolt 61 is inserted into the through hole of the corresponding mounting piece 42. As a result, the air bag 31 is secured to the inner panel 24 with the mounting pieces 42.

A roof bow 63 is secured to the surface of the roof panel 22 at a position that faces the passenger compartment 20a and that is located between the front side of the vehicle 20 and the inner panel 24. The roof bow 63 extends in the width direction of the vehicle 20. The roof bow 63 has a pair of mounting holes (not shown) corresponding to the securing belts 44a of the air bag 31. A clip 64 is inserted through the clip hole 45 of each securing belt 44a and engaged to the mounting hole. Accordingly, the roof side inflation portion 31c of the air bag 31 is secured to the roof bow 63.

As described above, the air bag 31 is secured to the inner panel 24 and the roof bow 63. In this state, part of the roof side inflation portion 31c closer to the upper rim 31e than the mounting pieces 42 is accommodated between the roof panel 22 and the roof headlining 23 in an unfolded state forming a substantially planar surface. Part of the air bag 31 closer to the lower rim 31f than the mounting pieces 42 is accommodated between the inner panel 24 and the roof headlining 23 in a state folded into a predetermined shape such that the air bag 31 will be unfolded toward the rear door 25 when inflated. As described above, the air bag 31 is accommodated between the roof panel 22 and the roof headlining 23 extending in the width direction of the vehicle 20.

The operations of the air bag device 30 for rear-end collision will be described below.

When an impact that is greater than or equal to a predetermined value is applied to the vehicle 20 from the rear side, an output signal from the impact sensor 37 is sent to the electronic control unit 38. The electronic control unit 38 sends an actuation signal to the inflator 32 based on the output signal. As a result, gas is generated in the inflator 32 and the gas is introduced into the air bag 31 via the gas supply pipe and the connecting portion 41.

Figure 8:
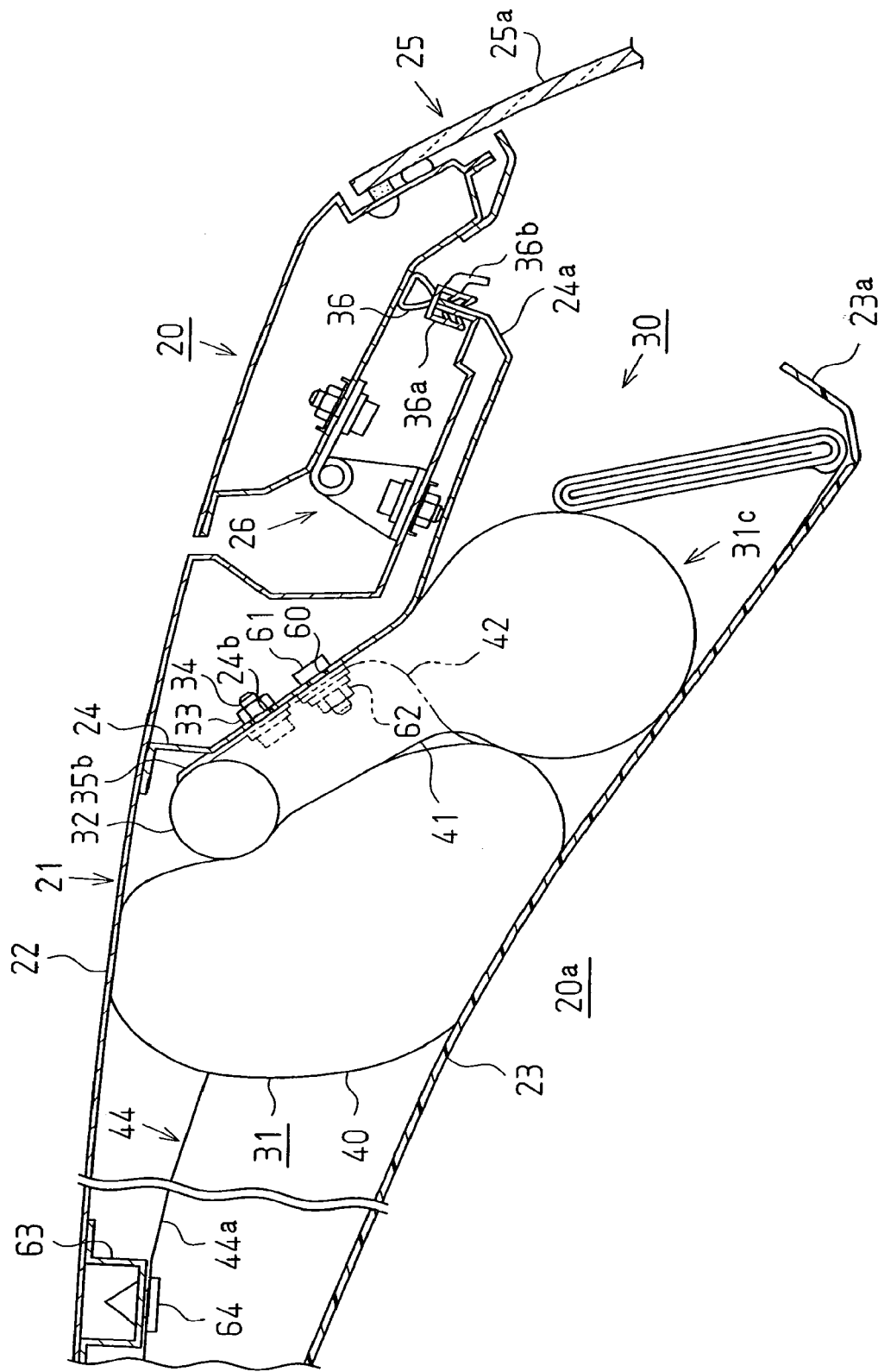
FIG. 8 is an enlarged cross-sectional view illustrating the rear portion of the vehicle showing the air bag at an initial stage of inflation.
Figure 9:
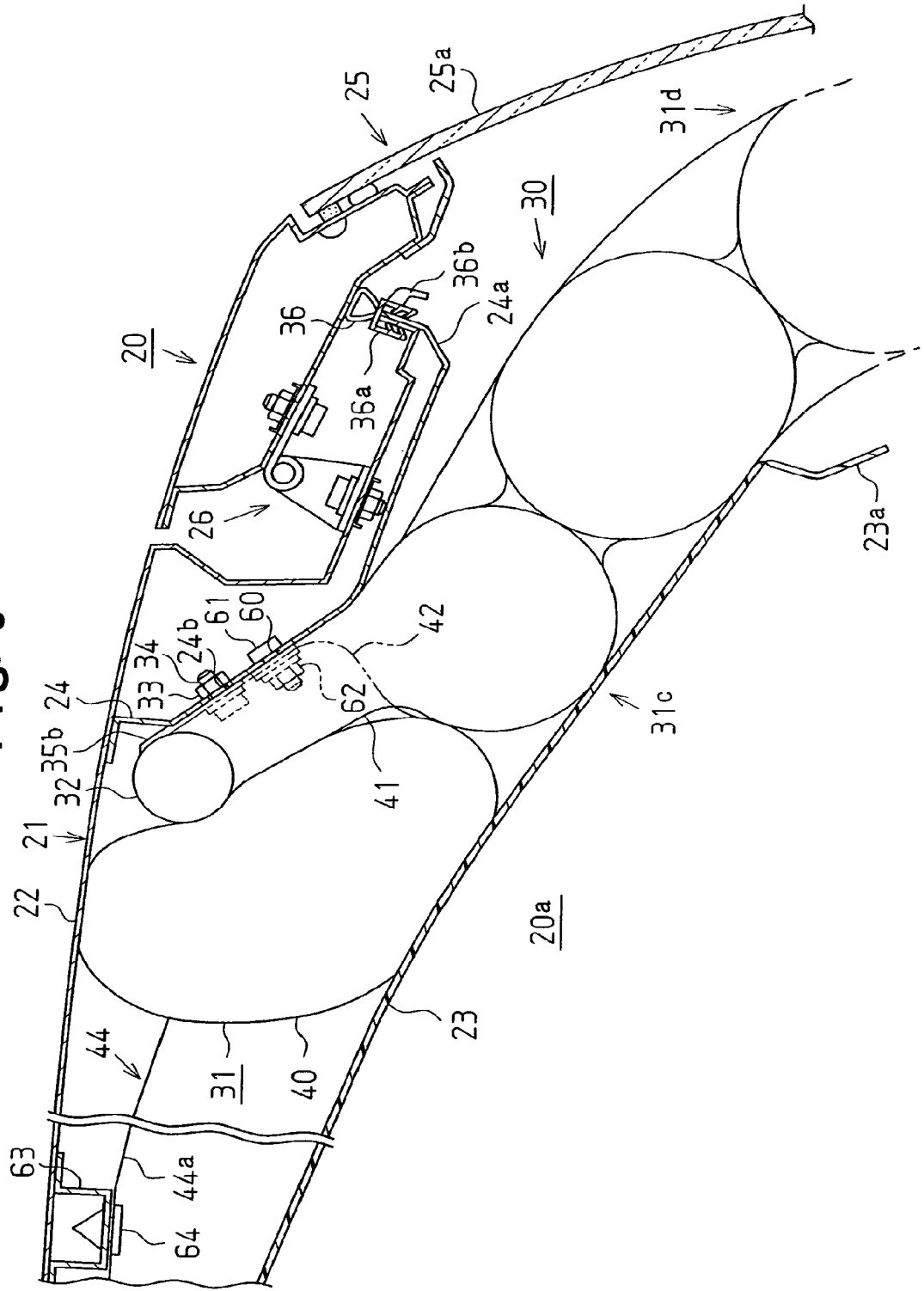
FIG. 9 is an enlarged cross-sectional view illustrating the rear portion of the vehicle showing the air bag at a last stage of inflation.

When gas is supplied to the air bag 31 from the inflator 32, pressure in the roof side inflation portion 31c is promptly increased and the roof side inflation portion 31c is inflated as shown in FIG. 8. The inflated roof side inflation portion 31c presses the roof headlining 23 downward. This force entirely displaces the rear portion of the roof headlining 23 downward, which causes the rear end 23a of the roof headlining 23 to separate from the covering piece 36b. As a result, an opening oriented toward the rear window glass 25a is formed between the roof headlining 23 and the inner panel 24. Consequently, the passenger compartment side inflation portion 31d of the air bag 31 is inflated to be unfolded along the rear window glass 25a as shown in FIG. 9.

The second embodiment provides the following advantages in addition to the advantages of the first embodiment.

The portion of the air bag 31 closer to the upper rim 31e than the mounting pieces 42, in other words, the roof side inflation portion 31c is accommodated in the space between the roof panel 22 and the roof headlining 23 in the unfolded state instead of folded state. Therefore, resistance to inflating the roof side inflation portion 31c is relatively smaller than a case where the roof side inflation portion 31c is inflated from a folded state. Thus, the roof side inflation portion 31c is promptly and smoothly inflated at the initial stage of the inflation operation of the air bag 31.

The roof side inflation portion 31c has a stable inflation amount in the vertical direction of the vehicle 20 and uniformly inflated in the width direction of the vehicle 20 as compared to a case where the roof side inflation portion 31c is inflated from the folded state. That is, the roof side inflation portion 31c is prevented from being partially inflated in the width direction of the vehicle 20. Thus, the pressing force of the inflated roof side inflation portion 31c is prevented from being applied to the roof headlining 23 excessively or partially. Therefore, the roof headlining 23 is prevented from being displaced excessively downward when the air bag 31 is inflated. As a result, in a case where a baggage that is relatively high is placed on the rearmost seat 27, the possibility that the roof headlining 23 interferes with the baggage is reduced.

The roof headlining 23 is uniformly pressed downward in the entire width direction of the vehicle 20 by the inflated roof side inflation portion 31c at the initial stage of the inflation of the air bag 31. Therefore, the opening through which the passenger compartment side inflation portion 31d projects to the passenger compartment 20a is formed in a suitable manner. Thus, the passenger compartment side inflation portion 31d is smoothly deployed.

Further, the roof side inflation portion 31c is located between the roof panel 22 and the roof headlining 23 in a planar state without being folded. Therefore, the distance between the roof panel 22 and the roof headlining 23 can be reduced at the position where the roof side inflation portion 31c exists. Thus, the space between the head of the occupant seated in the rearmost seat 27 and the roof headlining 23, or the head clearance, is easily obtained.

The roof side inflation portion 31c has the pair of securing portions 44 for securing the air bag 31 to the vehicle 20. Therefore, the roof side inflation portion 31c is inflated at a predetermined position in a stable manner. Since the stable unfolded state of the roof side inflation portion 31c is maintained, the gas from the inflator 32 is smoothly supplied to the entire roof side inflation portion 31c.

The pair of securing portions 44 is located in the vicinity of the upper rim 31e of the air bag 31 and on both end portions in the width direction. Therefore, the unfolded state of the roof side inflation portion 31c is further stabilized.

The length of the securing belts 44a can be determined in accordance with several conditions, such as the size and shape of the roof side inflation portion 31c, or the structure of the vehicle body. Therefore, the securing belts 44a are secured to the roof bow 63 in a suitable manner without changing the size and shape of the roof side inflation portion 31c, or the structure of the vehicle body, but by only changing the length of the securing belts 44a. Also, for example, the inflation shape of the roof side inflation portion 31c is adjusted by only adjusting the length of the securing belts 44a. Therefore, the inflation characteristic of the air bag 31 is easily adjusted to a desired characteristic.

Figure 10:
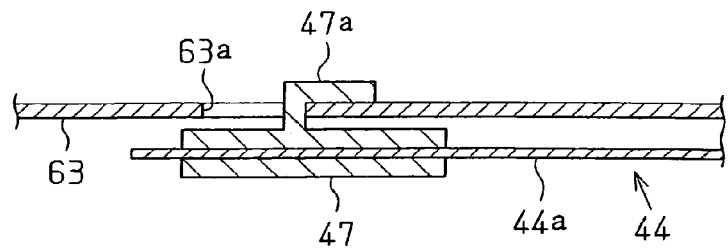
FIG. 10 is a partial cross-sectional view illustrating a modified example of a securing portion according to a second embodiment.

For example, a fixing bracket 47, which has a hook 47a as shown in FIG. 10, may be formed at the distal end of each securing belt 44a. In this case, the hook 47a of each fixing bracket 47 is engaged with one of through holes 63a formed in the roof bow 63 to secure the roof side inflation portion 31c to the vehicle 20.

The securing belts 44a may be coupled to the vehicle 20 using bolts and nuts, rivets, tapping screws, weld nuts, adhesive tape, or adhesives instead of the clips 64 of FIG. 7 or the fixing brackets 47 of FIG. 10. The securing belts 44a may also be coupled to the vehicle 20 by arranging a bracket at the distal end of each securing belt 44a, and engaging the brackets with the roof bow 63 between the roof panel 22 and the roof bow 63.

The roof bow 63 may be omitted, and the securing belts 44a may be coupled to any portion of the vehicle 20 other than the roof bow 63.

The material of fabric forming the securing belts 44a may differ from the material of fabric forming the ground fabric 40. The material of the securing belts 44a may be changed as required as long as the securing belts 44a can maintain the roof side inflation portion 31c in an unfolded state.

The coupling position of the securing belts 44a to the air bag 31 need not be the position shown in FIG. 6. For example, the securing belts 44a may be coupled to portions of the air bag 31 between the mounting pieces 42 and the upper rim 31e.

The number of securing belts 44a may be one or three or more. When the number of the securing belt 44a is one, it is preferable to provide a rod made of hard resin along the upper rim 31e of the air bag 31 to keep the unfolded state of the roof side inflation portion 31c.

String members having the equivalent function as the securing belts 44a may be used instead of the securing belts 44a.

The securing belts 44a may be omitted. In this case, the end portion of the roof side inflation portion 31c may be directly secured to the vehicle 20 or need not be secured to the vehicle 20.

Figure 11:
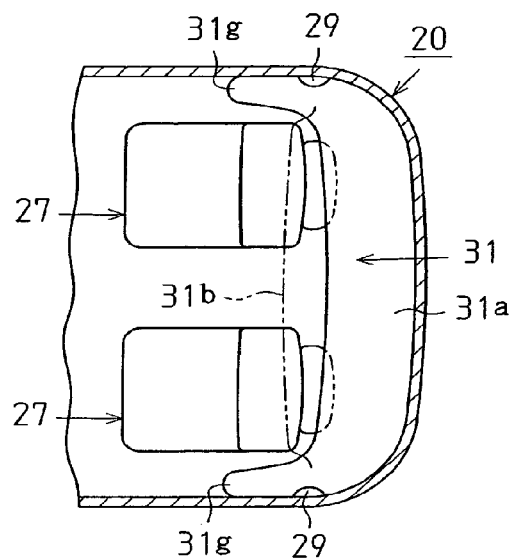
FIG. 11 is a cross-sectional plan view illustrating the rear portion of the vehicle that has an air bag according to a modified example of the first and second embodiments.
Figure 12:
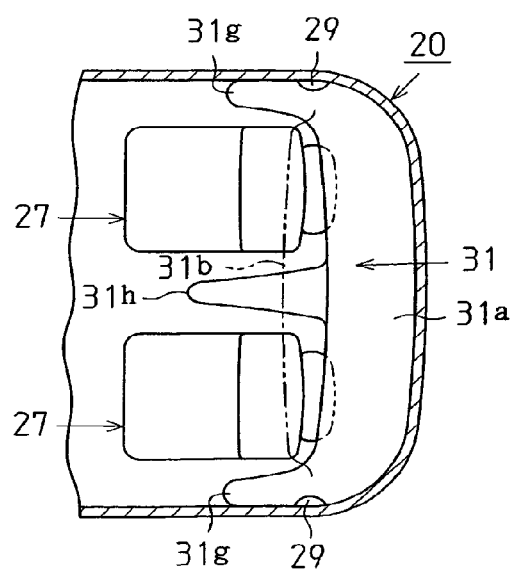
FIG. 12 is a cross-sectional plan view illustrating the rear portion of the vehicle that has an air bag according to a modified example of the first and second embodiments.

The first and second embodiments may be changed as shown in FIGS. 11 and 12.

That is, as shown in FIG. 11, the door side unfolding portion 31a of the air bag 31 may include rear pillar side unfolding portions 31g, which is deployed to cover the rear pillars 29 of the vehicle 20. In this case, the rear pillar side unfolding portions 31g are unfolded in the width direction from the side portions of the door side unfolding portion 31a after the door side unfolding portion 31a is inflated to be unfolded downward from the rear end of the roof 21. Alternatively, the door side unfolding portion 31a may be unfolded downward from the rear end of the roof 21 with the rear pillar side unfolding portions 31g unfolded in the width direction of the vehicle 20 from the beginning.

When vehicles cause a rear-end collision in an offset state in which the vehicles are displaced from each other in the width direction, the occupant might contact the side portions inside the passenger compartment although the occupant is wearing a seat belt. However, in the modified embodiment shown in FIG. 11, the rear pillar side unfolding portions 31g receive the occupant who has moved laterally and protect the occupant.

Alternatively, as shown in FIG. 12, the door side unfolding portion 31a of the air bag 31 may further include the center unfolding portion 31h. In this case, the center unfolding portion 31h extends between two occupants seated in the rearmost seat 27. This reduces the impact caused when the occupants collide with each other. In FIG. 12, the rear pillar side unfolding portions 31g are provided but may be omitted.

An air bag device according to a third embodiment of the present invention will now be described with reference to FIGS. 13 to 16. Like or the same reference numerals are given to those components that are like or the same as the corresponding components of the first embodiment of FIGS. 1 to 5.

Figure 13:
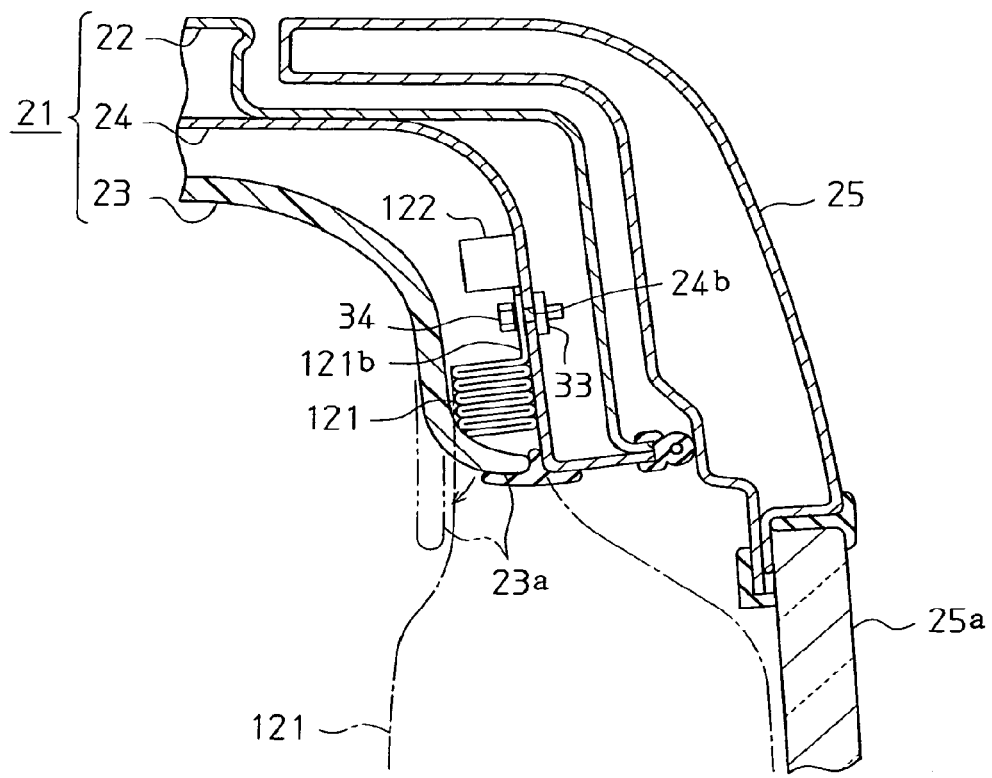
FIG. 13 is an enlarged cross-sectional view illustrating the rear portion of the vehicle that has an air bag device according to a third embodiment of the present invention.

FIG. 13 is a cross-sectional view taken along line 1-1 in FIG. 4. As shown in FIG. 13, the shapes of the roof 21 and the rear door 25 of the vehicle 20 of the third embodiment differ from those of the vehicle 20 shown in FIG. 1. However, the functions of the roof 21 and the rear door 25 of the third embodiment are the same as the vehicle 20 shown in FIG. 1. For the structure of the vehicle 20 of the third embodiment, refer to FIGS. 3 and 4 as required.

In the third embodiment, an air bag 121 and an inflator 122 are located at the rearmost end of the roof 21. When the air bag 121 is folded, the rear end 23a of the roof headlining 23 is engaged with the end portion of the inner panel 24 (as shown by a solid line in FIG. 13). When the air bag 121 is unfolded, the rear end 23a is pushed open by the air bag 121 (as shown by a chain double-dashed line in FIG. 13).

The mounting holes 24b (only one is shown in FIG. 13) are formed at the end portion of the inner panel 24 at the rear side of the vehicle 20. The mounting nuts 33 are welded on the inner panel 24. Each mounting nut 33 corresponds to one of the mounting holes 24b. The air bag 121 and the inflator 122 are secured to the inner panel 24 with the mounting nuts 33 to be located in the space between the inner panel 24 and the roof headlining 23.

Figure 14:
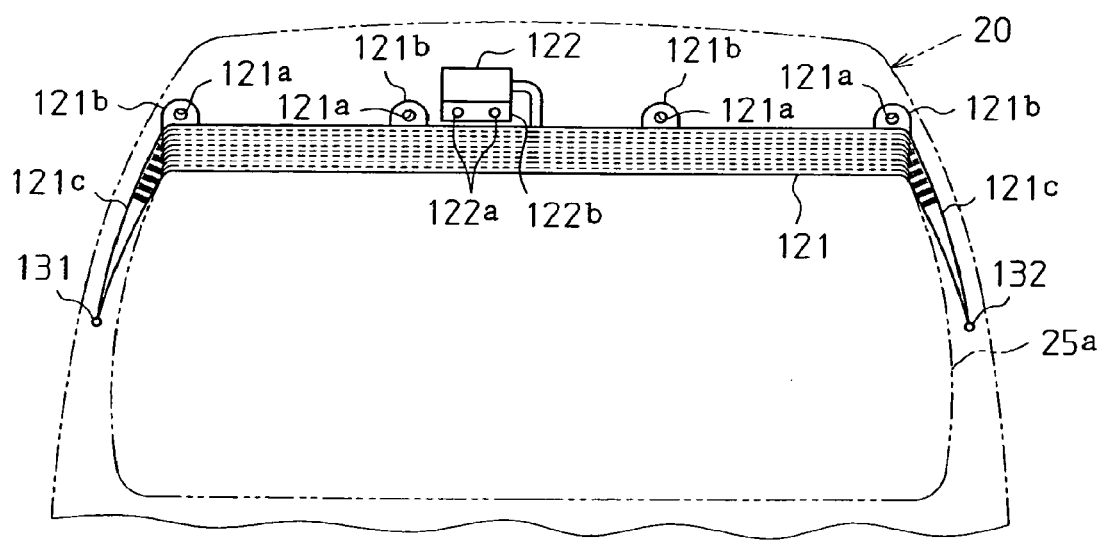
FIG. 14 is a rear view illustrating the folded air bag and the inflator of FIG. 13.

As shown in FIG. 14, the air bag 121 is folded to be substantially rectangular when not inflated. An extended portion 121c extends diagonally downward from each end of the air bag 121. The air bag 121 is mounted to the vehicle 20 in a folded state. Mounting pieces 121b are formed on one side of the air bag 121 that is folded to be substantially rectangular. A mounting hole 121a is formed in each mounting piece 121b. Each mounting hole 121a corresponds to one of the mounting holes 24b of the inner panel 24. The inflator 122 also has a mounting piece 122b, which has two mounting holes 122a. The mounting holes 122a correspond to two of the mounting holes 24b of the inner panel 24. As shown in FIG. 13, each mounting bolt 34 is inserted into one of the mounting holes 121a of the air bag 121 and the corresponding mounting hole 24b of the inner panel 24, and screwed to the corresponding nut 33. As a result, the air bag 121 and the inflator 122 are secured to the inner panel 24 and are accommodated in the roof headlining 23 and the inner panel 24.

The extended portions 121c located on both ends of the air bag 121 function as tension applying portions. The lower end of each tension applying portion 121c is secured to one of securing members located on the vehicle 20, or more specifically, to one of the left and right side walls of the inner panel 24, with a bolt and a nut (not shown). The lower ends of the tension applying portions 121c secured to the vehicle 20 are tension applying points 131, 132. The rear end 23a of the roof headlining 23 extends in the width direction of the vehicle 20, and covers the rear pillar (not shown) of the vehicle 20. That is, the rear end 23a of the roof headlining 23 covers the tension applying portions 121c such that the tension applying portions 121c are not seen from the outside. Although not shown in the drawings, the tension applying portions 121c may be accommodated between a side pillar garnish and the vehicle body. The positions of the tension applying points 131, 132 need not be the positions shown in FIG. 14, but may be changed along the vertical direction of the rear window glass 25a.

The tension applying portions 121c and the tension applying points 131, 132 function to limit the rearward movement of the occupant seated in the rearmost seat 27.

The air bag 121 is arranged to be unfolded toward the rear end 23a of the roof headlining 23 when inflated. The air bag 121 is unfolded as if dropping in substantially the gravity direction from the rear end 23a as shown by a dashed line in FIG. 13. In other words, the air bag 121 is unfolded along the rear window glass 25a to partition between the rear window glass 25a and the rearmost seat 27.

Figure 15:
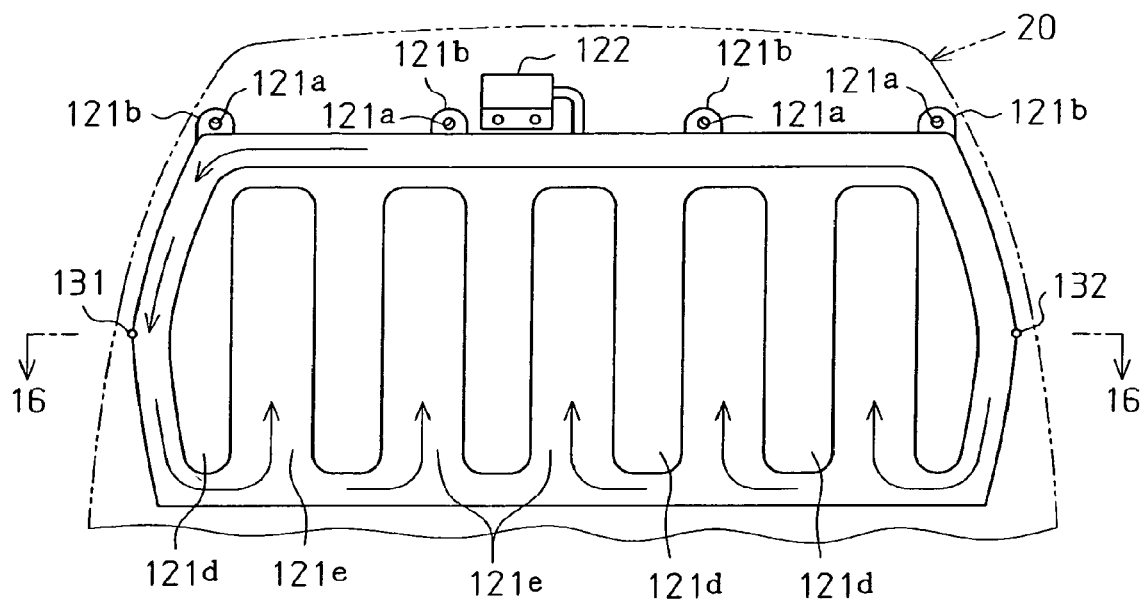
FIG. 15 is a rear view illustrating the unfolded air bag of FIG. 14
Figure 16:
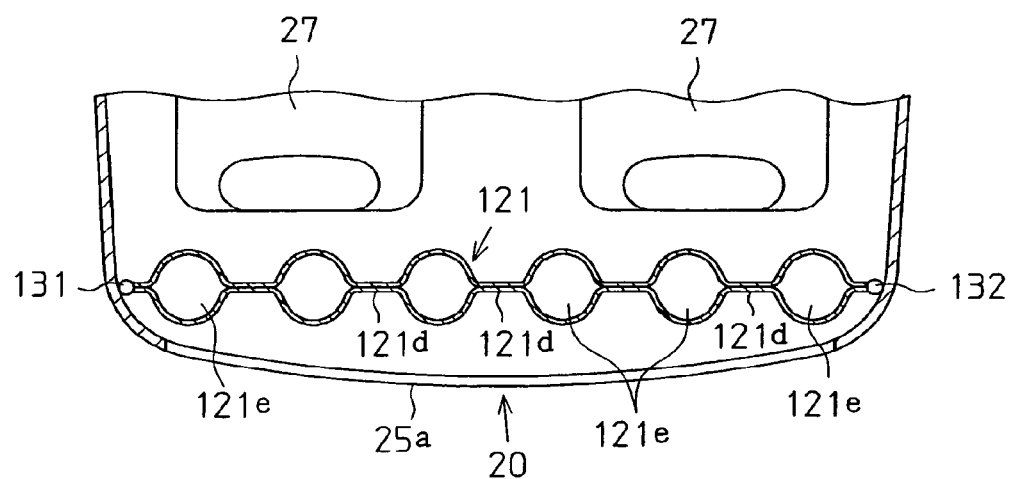
FIG. 16 is a cross-sectional view taken along line 16-16 in FIG. 15.

As shown in FIGS. 15 and 16, facing portions of the ground fabric forming the air bag 121 are joined together to form closed portions (joint portions) 121d, which extend parallel to each other in the vertical direction. The closed portions 121d are connected to each other at the upper ends and form a comb-like shape as a whole. The closed portions 121d define cylindrical cells 121e in the air bag 121. The cylindrical cells 121e extend parallel to each other in the vertical direction when the air bag 121 is unfolded. The lower ends of the cylindrical cells 121e are communicated with each other. The inflation gas is supplied into the air bag 121 from both left and right sides and flows through the lower part of the air bag 121 before reaching each cylindrical cell 121e.

As described in the first embodiment shown in FIGS. 1 to 5, the inflator 122 supplies inflation gas to the air bag 121 based on reception of the actuation signal from the electronic control unit 38. When the inflation gas is supplied to the air bag 121, the air bag 121 is deployed to partition between the rear window glass 25a and the rearmost seat 27 as shown in FIG. 16. If an occupant seated in the rearmost seat 27 moves rearward along the backrest of the rearmost seat 27 by a rear-end collision of the vehicle 20, the inflated air bag 121 receives the occupant and prevents the occupant from being thrown out of the rear window glass 25a.

When the air bag 121 is unfolded, the internal pressure of each cylindrical cell 121e is maintained at, for example, 25 kPa for one second or more to apply a predetermined tension to the air bag 121.

The third embodiment provides the following advantages in addition to the advantages of the first and second embodiments shown in FIGS. 1 to 12.

The tension applying portions 121c are located on both sides of the air bag 121. The lower ends of the tension applying portions 121c, or the tension applying points 131, 132, are secured to the securing members of the vehicle 20 at the middle position of the rear window glass 25a in the vertical direction. Therefore, tension is applied to the inflated air bag 121 at the tension applying points 131, 132. Thus, even if an occupant seated in the rearmost seat 27 moves rearward along the backrest by a rear-end collision of the vehicle 20, the air bag 121 reliably restricts the rearward movement of the occupant and effectively protects the occupant.

The interior of the air bag 121 is divided into cylindrical cells 121e by the closed portions 121d. Therefore, as shown in FIG. 16, the thickness of the air bag 121 is restricted and a suitable tension is applied to the air bag 121.

As shown in FIG. 15, the inflation gas is supplied into the air bag 121 from both left and right sides and flows through the lower part of the air bag 121 before reaching each cylindrical cell 121e. This structure is effective in promptly forming a receiving surface of the air bag 121, and the air bag 121 reliably receives the occupant.

The tension applying portions 121c, which extend from the air bag 121, are part of the air bag 121 and not separate parts. Therefore, the structure required for applying a tension to the air bag 121 is simplified, which facilitates manufacturing of the air bag device and assembling of the air bag device to the vehicle 20.

The air bag 121 is unfolded as if dropping in substantially the gravity direction from the rear end of the roof 21. Therefore, the air bag 121 is deployed at the rear of the rearmost seat 27. This prevents the air bag 121 from interfering with the occupant seated in the rearmost seat 27 when the air bag 121 is deployed.

The third embodiment may employ a structure in which the air bag 121 is unfolded upward from the lower portion.

The third embodiment shown in FIGS. 13 to 16 may be changed as shown in FIGS. 17 to 20.

Figure 17:
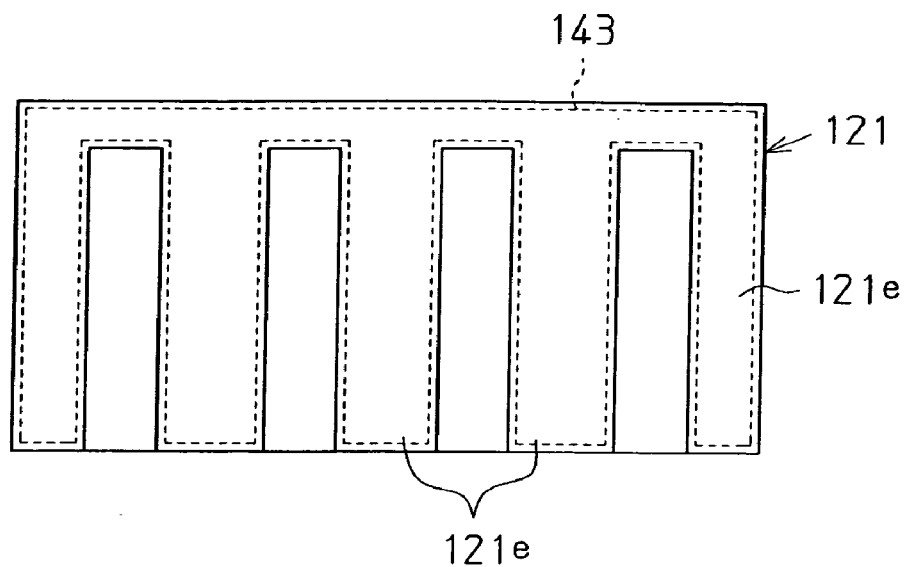
FIG. 17 is a schematic front view illustrating an air bag according to a modified example of the third embodiment.

As shown in FIG. 17, the air bag 121 may be formed by sewing together a rectangular cloth and a substantially comb like cloth. In this case, gas from the inflator 122 is, for example, supplied to the cylindrical cells 121e from the vicinity of the middle portion at the upper rim of the air bag 121. Each of the cloths forming the air bag 121 is coated to maintain air tightness. A seam 143 is shown by a dotted line on the air bag 121 in FIG. 17. Since the seam 143 forms minute holes in the air bag 121, it is preferable to provide coating along the seam 143 after sewing the cloths together.

Figure 18:
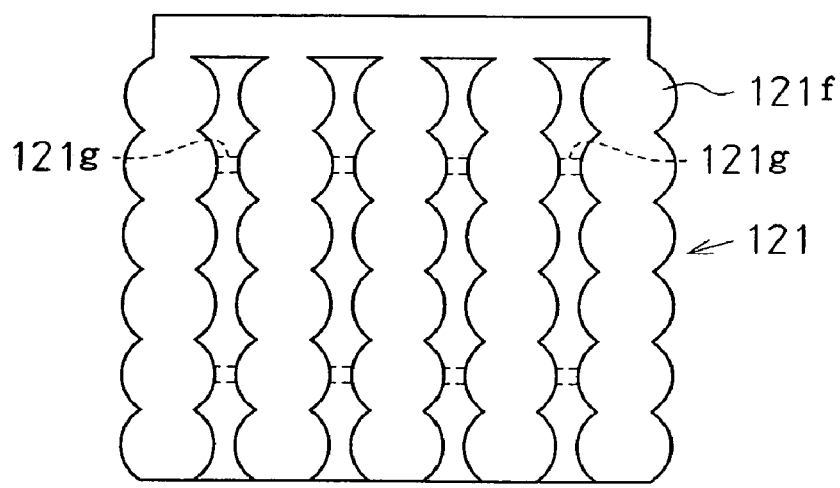
FIG. 18 is a schematic front view illustrating an air bag according to a modified example of the third embodiment.

As shown in FIG. 18, lines of beaded spherical cells 121f may be provided instead of the lines of cylindrical cells 121e. In this case, the spherical cells 121f of the adjacent two lines may be communicated with each other via a passage 121g.

Figure 19:
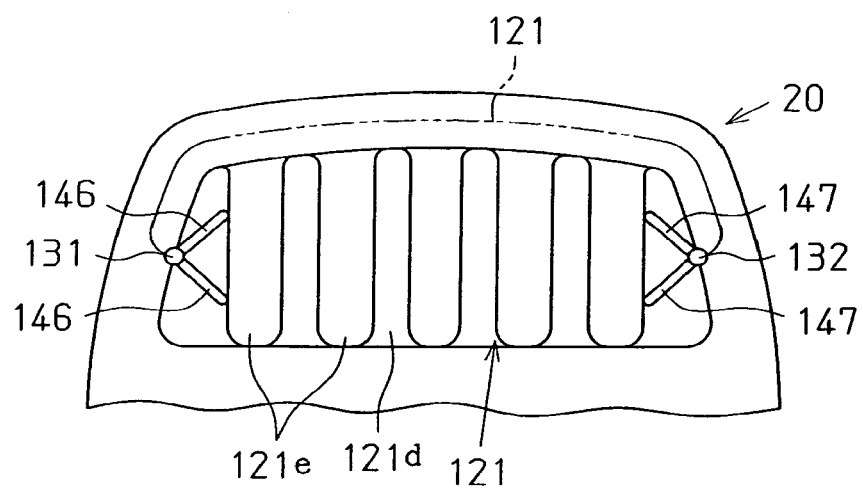
FIG. 19 is a schematic front view illustrating an air bag according to a modified example of the third embodiment.

As shown in FIG. 19, a pair of tension applying belts 146 may be coupled to one tension applying point 131, and a pair of tension applying belts 147 may be coupled to the other tension applying point 132. Each pair of belts 146, 147 may be coupled to the air bag 121 forming a V-shape.

Figure 20:
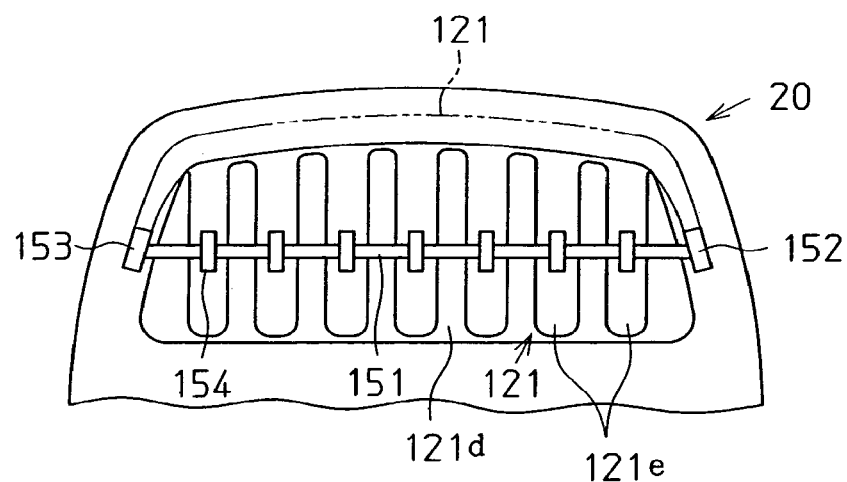
FIG. 20 is a schematic front view illustrating an air bag according to a modified example of the third embodiment.

As shown in FIG. 20, a tension applying belt 151 that extends in the width direction of the vehicle 20 may be provided. One end of the tension applying belt 151 is secured to the right side securing member of the vehicle 20 with a fastener 152, and the other end of the tension applying belt 151 is coupled to a winding device 153 mounted to the left side securing member of the vehicle 20. The winding device 153 selectively winds the tension applying belt 151. The tension applying belt 151 is stretched between the fastener 152 and the winding device 153 with a predetermined tension passing through guide pieces 154, which are attached to the air bag 121. When the air bag 121 is folded, the tension applying belt 151 is wound off from the winding device 153 and is accommodated in the space between, for example, the roof headlining 23 and the inner panel 24 with the air bag 121 (see FIG. 13).

An air bag device according to a fourth embodiment of the present invention will now be described with reference to FIGS. 21 to 25. The differences from the third embodiment of FIGS. 13 to 16 will mainly be discussed below, and like or the same reference numerals are given to those components that are like or the same as the corresponding components of the third embodiment of FIGS. 13 to 16.

Figure 21:
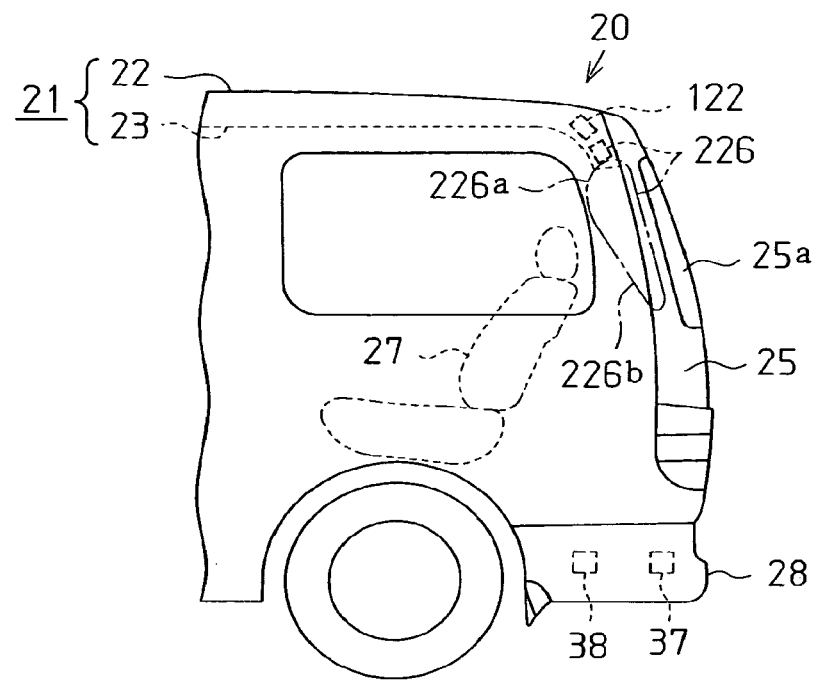
FIG. 21 is a side view illustrating the rear portion of the vehicle that has an air bag device according to a fourth embodiment of the present invention.
Figure 22:
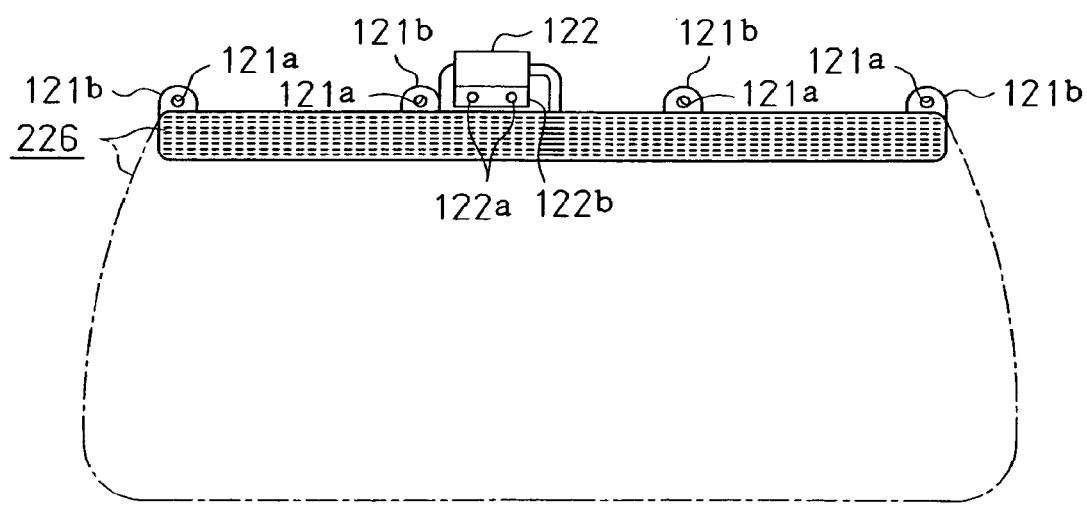
FIG. 22 is a front view illustrating the air bag device of FIG. 21.

The air bag device of the fourth embodiment is applied to the vehicle 20 shown in FIG. 21. The vehicle 20 shown in FIG. 21 is the same as the vehicle 20 shown in FIG. 13. An air bag 226 of the fourth embodiment and the inflator 122 are arranged and mounted to the vehicle 20 in the same manner as those shown in FIG. 13. The structure of the air bag 226 of the fourth embodiment differs from the air bag 121 of the third embodiment of FIGS. 13 to 16 in that the air bag 226 does not have the tension applying portions 121c as shown in FIG. 14 (see FIG. 22).

The structure of the air bag 226 will now be described.

Figure 23:
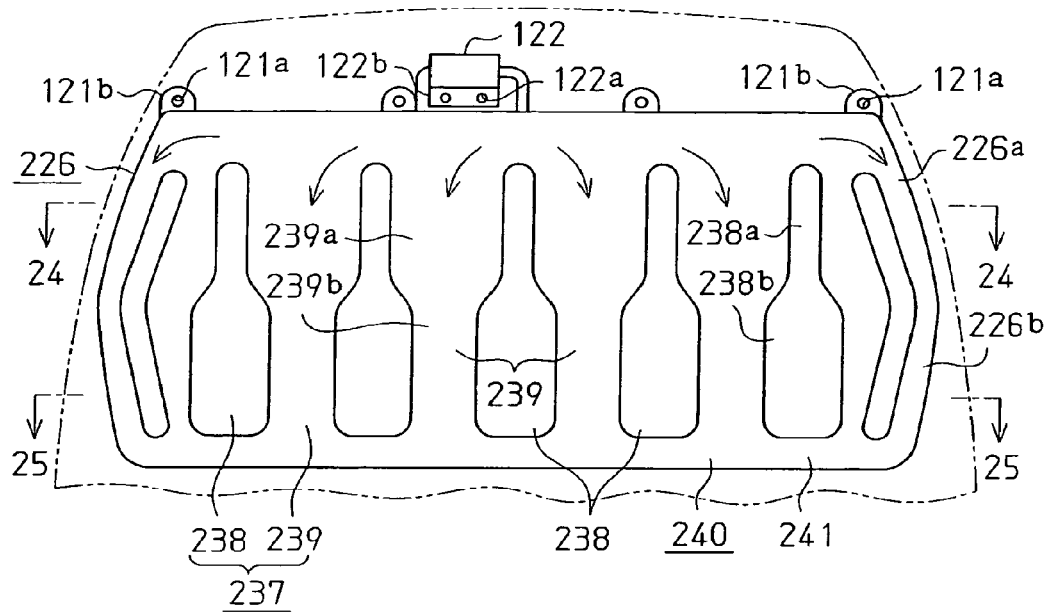
FIG. 23 is a front view illustrating the air bag device of FIG. 22 with the air bag in an unfolded state.
Figure 24:
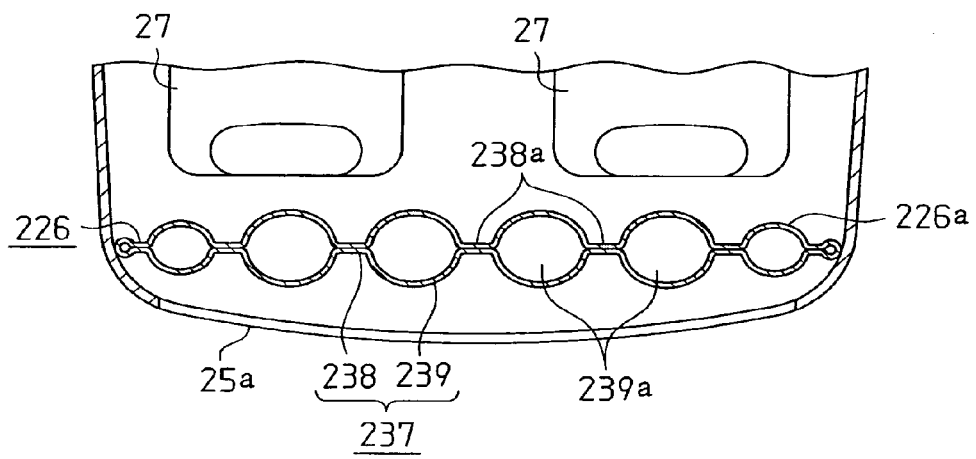
FIG. 24 is a cross-sectional view taken along line 24-24 in FIG. 23.
Figure 25:
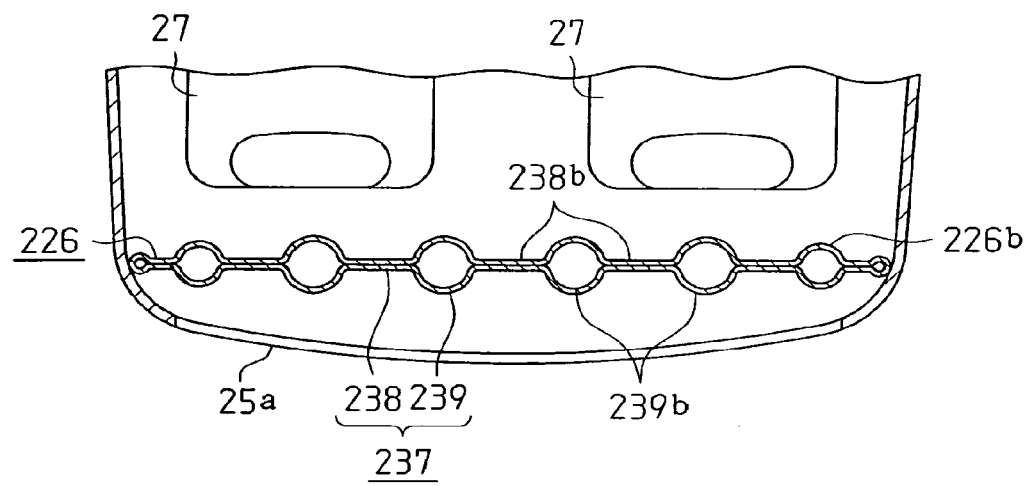
FIG. 25 is a cross-sectional view taken along line 25-25 in FIG. 23.

As shown in FIGS. 21 and 23 to 25, the air bag 226 has an upper bag portion 226a, which is deployed above the upper end of the rearmost seat 27, and a lower bag portion 226b, which is located below the upper bag portion 226a. The air bag 226 further includes a thickness restricting structure (thickness restricting mechanism) 237. The thickness restricting structure restricts the thickness of the air bag 226 such that the thickness of the inflated upper bag portion 226a is greater than the thickness of the inflated lower bag portion 226b. The thickness of the air bag 226 refers to the dimension in the front and rear direction of the vehicle 20. As shown in FIGS. 23 to 25, the thickness restricting structure 237 includes closed portions (joint portions) 238, which extend in the vertical direction at predetermined intervals. The closed portions 238 are formed by partially joining the opposing portions of the ground fabrics. The air bag 226 includes cells 239, which extend vertically between the adjacent closed portions 238. The closed portions 238 are independent from each other, and the cells 239 are communicated with each other. Each closed portion 238 has a bottle-like shape and the width of an upper portion 238a of the closed portion 238 is narrower than the width of a lower portion 238b of the closed portion 238. Therefore, an upper portion 239a of each cell 239 has a greater capacity than a lower portion 239b of the cell 239. Thus, when the air bag 226 is inflated, the thickness of the upper portion 239a is greater than the thickness of the lower portion 239b.

The lower bag portion 226b includes a rigid portion 240 for improving flexural rigidity of the lower bag portion 226b. The rigid portion 240 is formed by a lateral cell 241, which extends along the entire width of the lower bag portion 226b along the lower rim of the lower bag portion 226b. The deployment of the lateral cell 241 improves the flexural rigidity of the lower bag portion 226b that has a relatively small thickness when inflated. The lateral cell 241 is communicated with the cells 239.

When inflation gas is supplied to the air bag 226 from the inflator 122, the air bag 226 is inflated to be unfolded downward and laterally along the rear window glass 25a between the rearmost seat 27 and the rear window glass 25a.

The fourth embodiment provides the following advantages in addition to the advantages of the embodiments shown in FIGS. 1 to 20.

The air bag 226 has the thickness restricting structure 237. Therefore, as shown in FIGS. 21 and 23 to 25, the upper bag portion 226a is inflated above the upper end of the rearmost seat 27 with a thickness greater than the lower bag portion 226b. Therefore, the upper bag portion 226a located above the rearmost seat 27 effectively absorbs the impact applied to the occupant seated in the rearmost seat 27, and particularly, the impact applied to the upper body including the head of the occupant. Although the inflator 122 has low power, the absorption effect of the impact applied to the occupant seated in the rearmost seat 27 can be increased without increasing the entire inflation amount of the air bag 226 very much.

The thickness restricting structure 237 is formed by the closed portions 238 and the cells 239, which are formed between the closed portions 238. That is, the thickness restricting structure 237 is not formed by adding other parts to the air bag 226. Therefore, forming the thickness restricting structure 237 does not increase the number of parts, and the structure of the thickness restricting structure 237 is simple.

When the air bag 226 is inflated, the lateral cell 241, which is inflated along the lower rim of the lower bag portion 226b, applies appropriate flexural rigidity to the lower bag portion 226b. Therefore, the entire shape of the unfolded air bag 226 is maintained at a desired shape, and the air bag 226 effectively protects the occupant.

The structure for applying the flexural rigidity to the lower bag portion 226b is achieved by the lateral cell 241, which extends along the entire width of the lower bag portion 226b. Therefore, the number of parts is not increased and the structure is simple.

The air bag 226 of the fourth embodiment shown in FIGS. 21 to 25 may be modified as shown in FIGS. 26 to 30.

Figure 26:
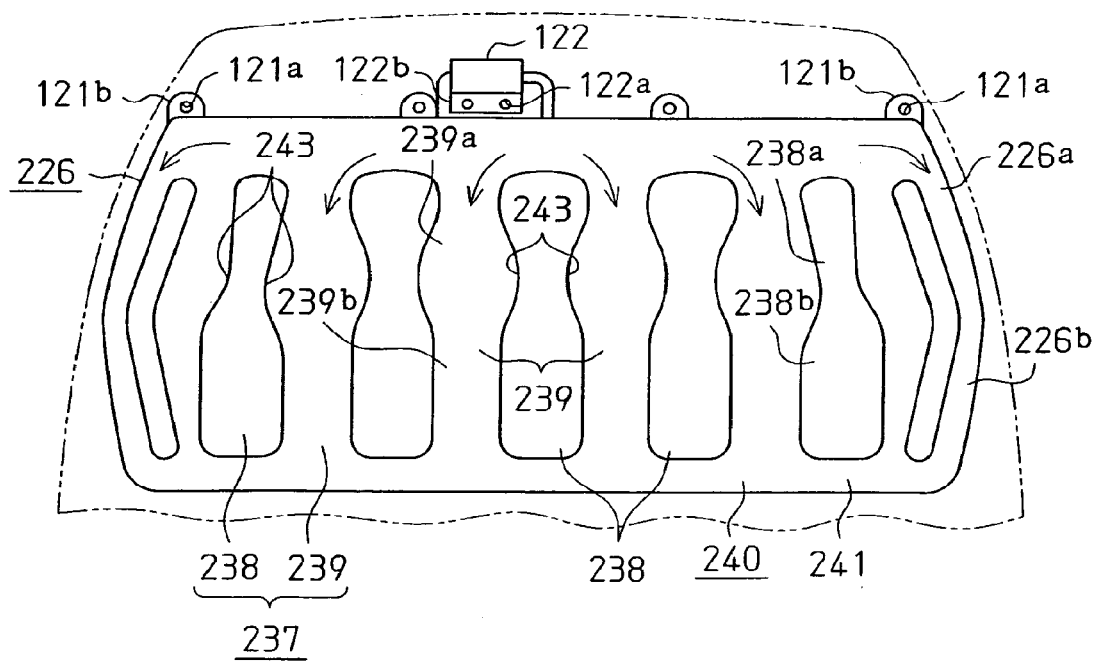
FIG. 26 is a front view illustrating an air bag according to a modified example of the fourth embodiment.

In a modified example shown in FIG. 26, a narrow part 243 is formed at the upper portion 238a of each closed portion 238. When the air bag 226 is deployed, the part of each cell 239 corresponding to each narrow part 243, that is, the upper portion 239a of each cell 239, is inflated to have the thickness greater than that of the lower portion 239b of each cell 239. Therefore, in the modified example shown in FIG. 26, the advantages of the fourth embodiment shown in FIGS. 21 to 25 are provided.

Figure 27:
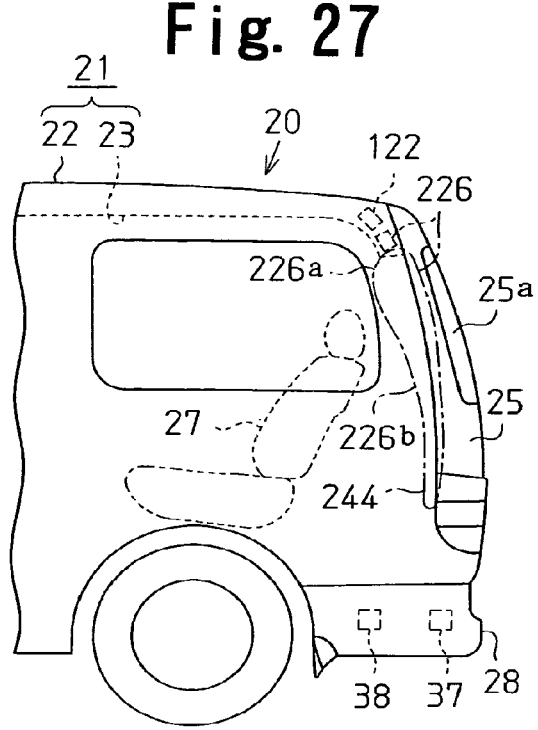
FIG. 27 is a side view illustrating the rear portion of the vehicle that has an air bag according to a modified example of the fourth embodiment.
Figure 28:
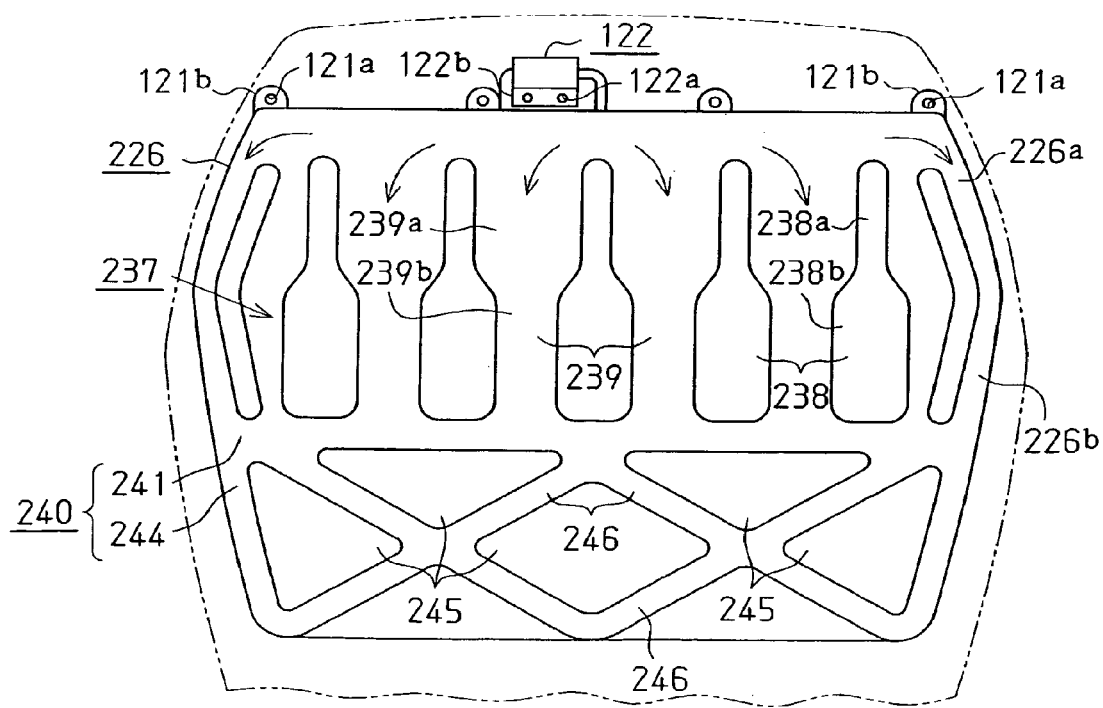
FIG. 28 is a front view illustrating the air bag of FIG. 27 in the unfolded state.

In a modified example shown in FIGS. 27 and 28, a dropping inflation portion 244, which functions as the rigid portion 240 with the lateral cell 241, extends downward from the lateral cell 241 to be located at the lower part of the rear window glass 25a. The dropping inflation portion 244 includes triangular or diamond-shaped closed portions (joint portions) 245 and cells 246, which are defined by the closed portions 245 to extend diagonally. The closed portions 245 are formed by partially joining the opposing portions of the ground fabric, which forms the air bag 226. The cells 246 intersect each other and are communicated with each other. When the air bag 226 is deployed, the dropping inflation portion 244 is deployed below the rear window glass 25a and to the vicinity of the floor of the passenger compartment.

In the modified example shown in FIGS. 27 and 28, the rigid portion 240 is formed by the lateral cell 241, which extends along the entire width of the lower bag portion 226b, and the dropping inflation portion 244, which is located below the rear window glass 25a. Therefore, both the lateral cell 241 and the dropping inflation portion 244 effectively increase the flexural rigidity of the lower bag portion 226b in a large area. This further reliably protects the occupant.

Figure 29:
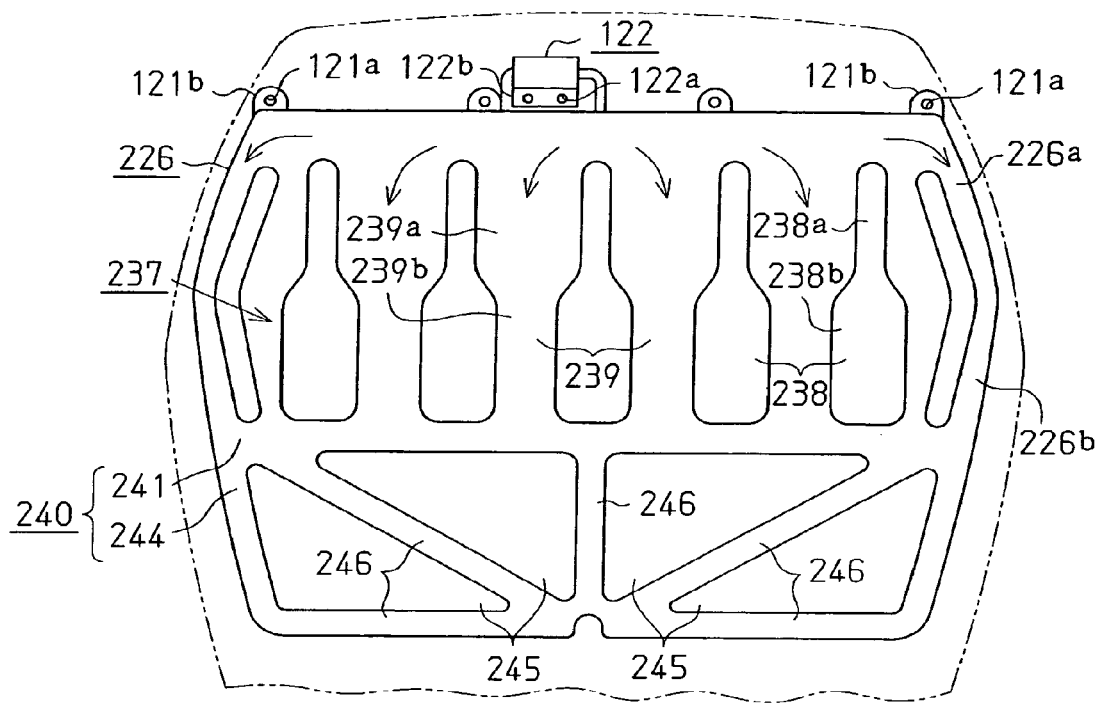
FIG. 29 is a front view illustrating an air bag according to a modified example of the fourth embodiment.

A modified example shown in FIG. 29 is the modification of the pattern of the closed portions 245 and the cells 246 of the dropping inflation portion 244 shown in FIG. 28. That is, as shown in FIG. 29, the dropping inflation portion 244 includes the closed portions 245 that are substantially right-angled triangle and the cells 246 that are defined by the closed portions 245 to extend laterally and diagonally.

Figure 30:
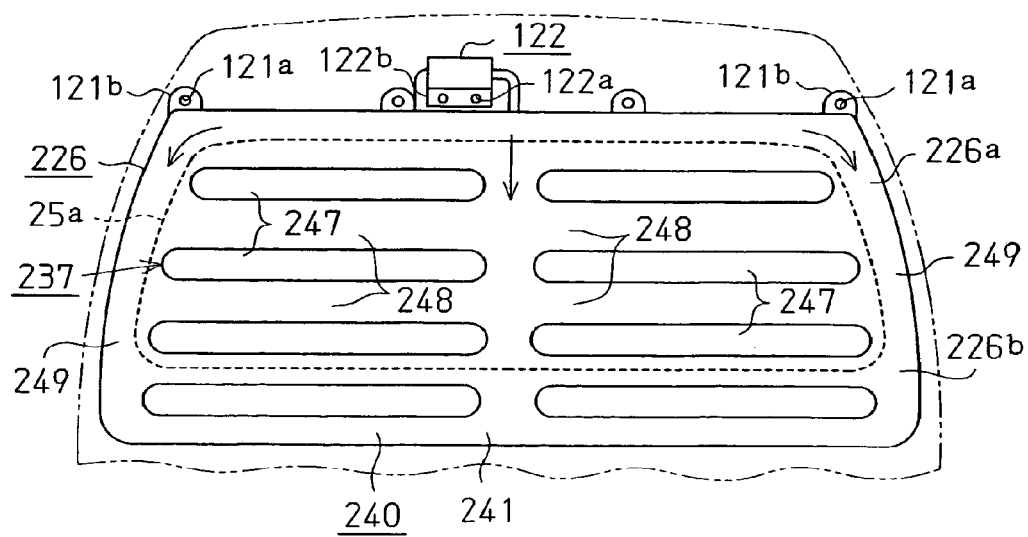
FIG. 30 is a front view illustrating an air bag according to a modified example of the fourth embodiment.

In a modified embodiment shown in FIG. 30, closed portions 247, which form the thickness restricting structure 237, extend laterally. Two columns of the closed portions 247 arranged at predetermined intervals along the vertical direction are provided. The closed portions 247 define cells 248, which extend laterally and communicated with each other. The space between adjacent closed portions 247 in the vertical direction is greater at the portion corresponding to the upper bag portion 226a than that of the lower bag portion 226b. Therefore, the thicknesses of the cells 248 of the upper bag portion 226a are greater than the thicknesses of the cells 248 of the lower bag portion 226b when the air bag 226 is inflated.

Vertical inflation portions 249, which function as the rigid portions, are formed on both sides of the air bag 226. The vertical inflation portions 249 are communicated with the cells 248. The vertical inflation portions 249 are arranged to extend vertically on both sides of the rear window glass 25a when the air bag 226 is deployed. The vertical inflation portions 249 improve the rigidity on both sides of the air bag 226. Thus, the protection effect of the occupant seated in the rearmost seat 27 is improved.

The pattern of the closed portions and the cells forming the thickness restricting structure is not limited to those shown in FIGS. 21 to 30 as long as the thickness of the upper bag portion 226a is greater than that of the lower bag portion 226b when the air bag 226 is inflated.

The pattern of the closed portions 245 and the cells 246 of the dropping inflation portion 244 need not be designed as shown in FIGS. 28 and 29. For example, the closed portions 245 may be rectangular so that the cells 246 form a grid pattern.

In the example shown in FIG. 30, the vertical width of the closed portions 247 at the upper bag portion 226a may be less than that of the closed portions 247 at the lower bag portion 226b. In this case also, the thicknesses of the cells 248 of the upper bag portion 226a are greater than the thicknesses of the cells 248 of the lower bag portion 226b when inflated.

An air bag device according to a fifth embodiment of the present invention will now be described with reference to FIGS. 31 and 32. Like or the same reference numerals are given to those components that are like or the same as the corresponding components of the third embodiment of FIGS. 13 to 16 and detailed explanations are omitted.

Figure 31:
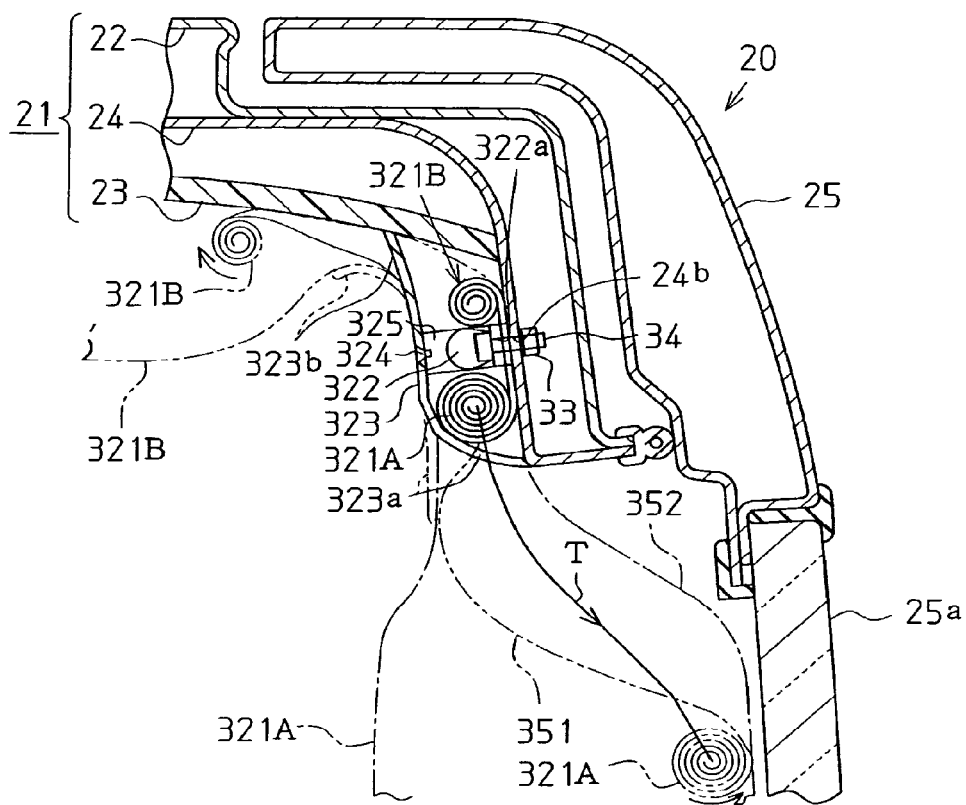
FIG. 31 is an enlarged cross-sectional view illustrating the rear portion of the vehicle that has an air bag device according to a fifth embodiment of the present invention.
Figure 32:
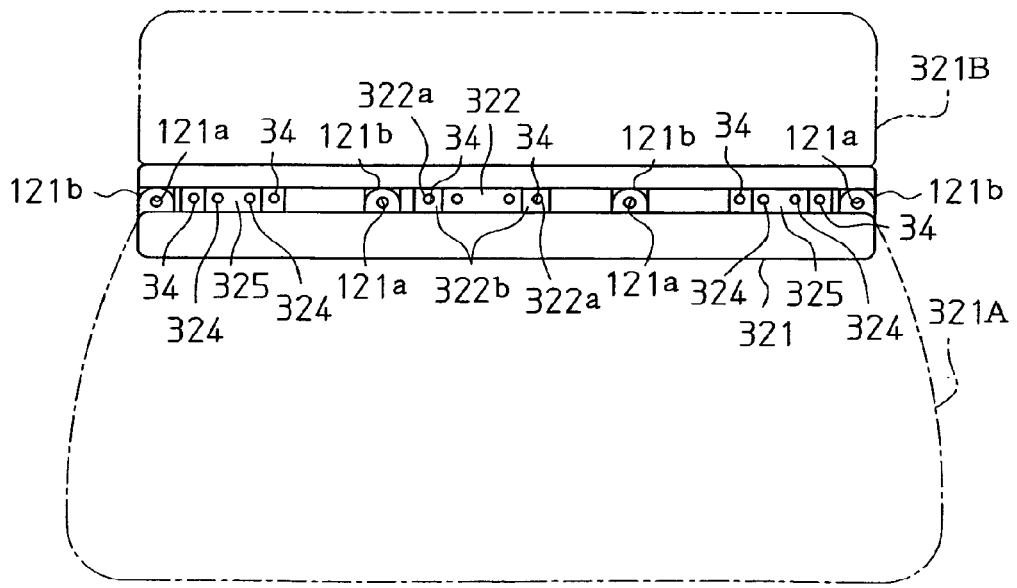
FIG. 32 is a front view illustrating the air bag of FIG. 31.

As shown in FIGS. 31 and 32, an air bag 321, which is attached to the rear end of the inner panel 24, and an inflator 322 are covered by a dedicated accommodating case 323, which functions as part of the roof headlining 23.

As shown in FIG. 31, the air bag 321 includes a lower air bag member 321A and an upper air bag member 321B. The upper and lower air bag members 321A and 321B are accommodated in the accommodating case 323 in a rolled state. The mounting pieces 121b are formed at a portion corresponding to the upper rim of the lower air bag member 321A. Each mounting piece 121b has a mounting hole 121a, which corresponds to one of the mounting holes 24b of the inner panel 24. The mounting pieces 121b are also formed at a portion corresponding to the lower rim of the upper air bag member 321B. Each mounting piece 121b has a mounting hole 121a, which corresponds to one of the mounting holes 24b of the inner panel 24. A pair of flanges 322b is located on the inflator 322. Each flange 322b has a mounting hole 322a. As shown in FIGS. 31 and 32, one of the mounting bolts 34 is inserted into each mounting hole 121a, 322a and the corresponding mounting hole 24b, and is screwed to one of the nuts 33. As a result, the upper and lower air bag members 321A, 321B and the inflator 322 are secured to the inner panel 24.

The accommodating case 323 is attached to the inner panel 24 to cover the air bag 321 and the inflator 322. Mounting bases 325 (see FIG. 32) are secured to the inner panel 24 by tightening mounting bolts 34 that are the same as the above mentioned mounting bolts 34 to the nuts 33. The accommodating case 323 is secured to the front surfaces of the mounting bases 325 with screws 324. The accommodating case 323 is formed of flexible synthetic resin material. The accommodating case 323 has a lower end portion 323*a*, which corresponds to the lower air bag member 321A, and an upper end portion 323*b*, which corresponds to the upper air bag member 321B. When the lower and upper air bag members 321A, 321B are deployed, each of the lower and upper air bag members 321A, 321B pushes open and deforms the corresponding end portion 323*a* or 323*b* as shown by chain double-dashed lines in FIG. 31.

When the lower air bag member 321A is accommodated in the accommodating case 323, the lower air bag member 321A is rolled clockwise toward the center of the roll such that the surface of the lower air bag member 321A that faces the rear window glass 25*a* is located at the outer circumferential side of the roll as shown in FIG. 31. The lower air bag member 321A pushes aside the lower end portion 323*a* of the accommodating case 323, and is deployed along the rear window glass 25*a* to partition between the rear window glass 25*a* and the rearmost seat 27.

On the other hand, the upper air bag member 321B is rolled counter-clockwise toward the center of the roll such that the surface of the upper air bag member 321B that faces the roof headlining 23 is located at the outer circumferential side of the roll as shown in FIG. 31. The upper air bag member 321B pushes aside the upper end portion 323*b* of the accommodating case 323, and is deployed along the roof headlining 23.

The lower air bag member 321A forms a rolled portion when accommodated in the accommodating case 323. The rolled portion functions to control the unfolding direction of the lower air bag member 321A. As mentioned above, the accommodating case 323 functions as part of the roof headlining 23. Therefore, the air bag 321 is accommodated in a space between the roof headlining 23 and the inner panel 24. In the fifth embodiment, the lower and upper air bag members 321A, 321B need to be exposed inside the passenger compartment by unfolding the lower and upper air bag members 321A, 321B in different directions. Therefore, the accommodating case 323 is not integrally formed with the main body of the roof headlining 23 but is separate from the main body of the roof headlining 23.

When an impact greater than or equal to a predetermined value is applied from the rear of the vehicle 20, an output signal from the impact sensor 37 is sent to the electronic control unit 38. The electronic control unit 38 then sends an actuation signal to the inflator 322 based on the output signal (see FIGS. 3 and 4 for the impact sensor 37 and the electronic control unit 38). As a result, gas is generated in the inflator 322 and is supplied to the interior of the lower and upper air bag members 321A, 321B. As shown in FIG. 31, the lower air bag member 321A is deployed along the rear window glass 25*a*, and the upper air bag member 321B is deployed along the lower surface of the roof headlining 23.

Since the lower air bag member 321A is deployed along the rear window glass 25*a*, the lower air bag member 321A is properly and promptly deployed without interfering with the head of an occupant seated in the rearmost seat 27. The deployed lower air bag member 321A reduces damage applied to the passenger compartment by scattered objects from the rear of the vehicle 20, and absorbs impact applied to the rear of the vehicle 20.

On the other hand, the upper air bag member 321B is deployed along the roof headlining 23. Therefore, even if the occupant moves upward by the impact applied to the vehicle 20, the head of the occupant is protected by the upper air bag member 321B.

The fifth embodiment provides the following advantages in addition to the advantages of the above embodiments.

As shown in FIG. 31, the rolled portion is formed by rolling the lower air bag member 321A. When gas from the inflator 322 is supplied to the lower air bag member 321A, the rolled portion is unrolled to deploy the lower air bag member 321A. At this time, the rolled portion moves along a path indicated by a line T in FIG. 31, that is, toward the rear window glass 25*a*. The reason for this is that since the rolled portion has a predetermined mass, when gas is supplied to the lower air bag member 321A, a rear side sheet 352 of the lower air bag member 321A moves more easily toward the rear window glass 25*a* than a front side sheet 351 of the lower air bag member 321A. That is, when the rolled portion is unrolled, the rolled portion generates a force to cause the lower air bag member 321A to approach the rear window glass 25*a*. Since the lower air bag member 321A is unfolded along the inner surface of the rear window glass 25*a*, the lower air bag member 321A is prevented from interfering with the head of the occupant seated in the rearmost seat 27. Therefore, the lower air bag member 321A is properly and promptly deployed, and the occupant is properly protected.

As shown in FIG. 31, the rolled portion is formed by rolling up the upper air bag member 321B. When gas from the inflator 322 is supplied to the upper air bag member 321B, the rolled portion is unrolled to deploy the upper air bag member 321B. At this time, the upper air bag member 321B is unfolded along the lower surface of the roof headlining 23. Therefore, the upper air bag member 321B is properly and promptly deployed without interfering with the head of the occupant, and the occupant is properly protected.

In the fifth embodiment shown in FIGS. 31 and 32, the rolled portions formed by the lower and upper air bag members 321A and 321B function as means for controlling the unfolding direction of the air bag. FIG. 33 shows a modified example of such unfolding direction controlling means. That is, as shown in FIG. 33, a pair of guide rails 345, 346 are mounted to the vehicle 20. The guide rails 345, 346 vertically extend along the vertical rim of the left and right sides of the rear window glass 25*a*. An air bag 321', which is also used as a sunshade, is located between the guide rails 345, 346. The upper rim of the air bag 321' is coupled to the rear end of the roof 21. A pair of guided rings 347, 348 is attached to both lower ends of the air bag 321'. Each of the guided rings 347, 348 is movable along the corresponding guide rail 345 or 346. In the fifth embodiment, the guide rails 345, 346 and the guided rings 347, 348 form means for controlling the unfolding direction of the air bag 321', or a guide mechanism for the air bag 321'. The air bag 321' is formed by two layers of transparent resin sheets. Therefore, the visibility through the air bag 321' is maintained. The air bag 321' is normally folded in the vicinity of the rear end of the roof 21.

An occupant of the vehicle 20 can use the air bag 321' as a sunshade by unfolding the non-inflated air bag 321' along the guide rails 345, 346 as required.

If gas is supplied to the air bag 321' from the inflator 322 when the air bag 321' is in the unfolded state, the air bag 321' is inflated in the unfolded state to provide the occupant protection function. If gas is supplied to the air bag 321' from the inflator 322 when the air bag 321' is in the folded state, the air bag 321' is inflated to be unfolded along the guide rails 345, 346, to protect the occupant in the rearmost seat 27. Since the air bag 321' is unfolded along the inner surface of the rear window glass 25*a*, the air bag 321' does not interfere with the head of the occupant seated in the rearmost seat 27. Accordingly, the air bag 321' is properly and promptly deployed.

In the modified example of FIG. 33, the air bag 321' may be selectively opened and closed by an electronic open and close mechanism, which is not shown.

Further, the lower and upper air bag members 321A, 321B of the fifth embodiment shown in FIGS. 31, 32 may be changed as shown in FIGS. 34(*a*) and 34(*b*).

In a modified example of FIG. 34(*a*), the rear side sheet 352 of the lower air bag member 321A that directly faces the rear window glass 25*a* and the rear side sheet 352 of the upper air bag member 321B that directly faces the roof headlining 23 are made of material that has a relatively large coefficient of friction, such as a silicon rubber coated cloth. The front side sheets 351 of the lower and upper air bag members 321A, 321B are made of material that has a relatively small coefficient of friction, such as a non-coated cloth. Accordingly, the lower and upper air bag members 321A, 321B are more smoothly and promptly deployed.

In a modified example of FIG. 34(*b*), the rear side sheet 352 of the lower air bag member 321A is formed of a high denier nylon ground fabric 353, which is generally used as material for air-bags, a rubber coating layer 354, and a felt layer 355. The rubber coating layer 354 is formed of, for example, silicon rubber and is attached to the ground fabric 353. The felt layer 355 is formed of, for example, polyamide and is attached to the rubber coating layer 354. In this case, fragments of the fear window glass 25*a* that is broken by the collision of the vehicle are received by the felt layer 355 and the rubber coating layer 354. This prevents the lower air bag member 321A from being damaged.

In addition to the above modified examples, the front side sheets 351 of the lower and upper air bag members 321A, 321B may be formed by cloths that permit transmission of air, and the rear side sheets 352 may be formed by cloths that do not permit transmission of air. In this case, the lower air bag member 321A is unfolded along the inner surface of the rear window glass 25*a*, and the upper air bag member 321B is unfolded along the inner surface of the roof headlining 23 by the thrust generated by gas leakage from the front side sheets 351.

A sixth embodiment of the present invention will now be described with reference to FIG. 35. In the sixth embodiment, a seat moving mechanism for moving the rearmost seat 27 is located on the rearmost seat 27. More specifically, the seat moving mechanism tilts a backrest 334 of the rearmost seat 27 forward. The air bag device shown in FIG. 31 is applied to the vehicle 20 shown in FIG. 35 but any other air bag device mentioned above may be applied to the vehicle 20.

The backrest 334 is supported by a hinge mechanism 336 and is tiltable with respect to a seat bottom 333 of the rearmost seat 27. A headrest 335 is attached to the upper portion of the backrest 334. A forward tilting actuator 337 formed by, for example, an air cylinder is coupled to the hinge mechanism 336 and actuates the hinge mechanism 336 to tilt the backrest 334. The hinge mechanism 336 and the forward tilting actuator 337 form a tilting mechanism for the backrest 334. The hinge mechanism 336 and the forward tilting actuator 337 also function as a mechanism for moving forward at least the head of an occupant seated in the rearmost seat 27.

Upon receipt of a detection signal from the impact sensor 37, the electronic control unit 38 operates the inflator 322 (see FIG. 31) and operates the forward tilting actuator 337 to tilt the backrest 334 forward. As a result, the occupant seated in the rearmost seat 27 is moved to tilt forward. This increases the space between the headrest 335 and the rear window glass 25*a*. Therefore, when the lower air bag member 321A is unfolded downward, the lower air bag member 321A is reliably prevented from interfering with the head of the occupant.

Figure 36:
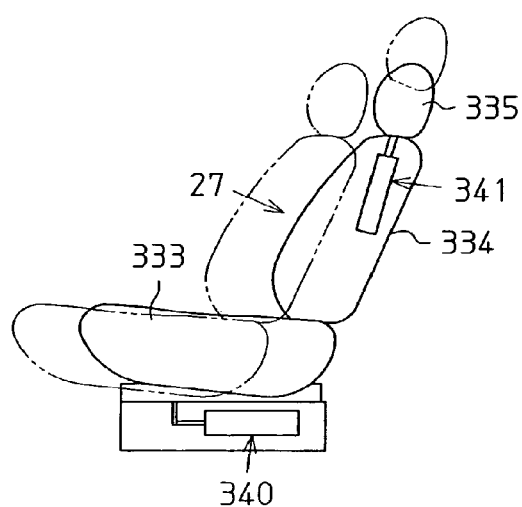
FIG. 36(*a*) is a side view illustrating a seat according to a modified example of the sixth embodiment.
Figure 36:
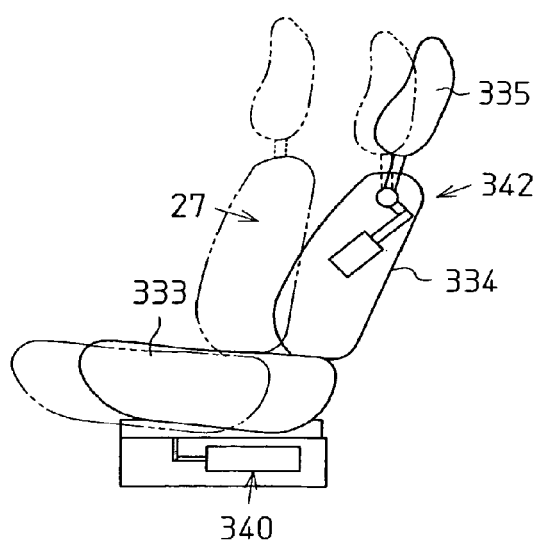

In a modified example of FIG. 36(*a*), a mechanism for moving the seat bottom 333 forward is employed as the seat moving mechanism. The moving mechanism is formed by a forward movement actuator 340, such as an air cylinder attached to the frame of the vehicle. Upon receipt of a detection signal from the impact sensor 37, the electronic control unit 38 operates the forward movement actuator 340 to move the entire rearmost seat 27. As a result, the lower air bag member 321A is prevented from interfering with the head of the occupant when the lower air bag member 321A is deployed.

In the modified example of FIG. 36(*a*), a mechanism for lifting the headrest 335 may further be provided as the seat moving mechanism. The lifting mechanism is formed by a lifting actuator 341 located inside the backrest 334. Upon receipt of a detection signal from the impact sensor 37, the electronic control unit 38 operates the lifting actuator 341 to lift the headrest 335. In this case also, since the head of the occupant seated in the rearmost seat 27 is moved forward, the lower air bag member 321A is prevented from interfering with the head of the occupant when the lower air bag member 321A is deployed. Also, only the lifting mechanism for the headrest 335 may be employed as the seat moving mechanism, and the moving mechanism for the seat bottom 333 may be omitted.

In a modified example shown in FIG. 36(*b*), a mechanism for tilting the headrest 335 forward is further employed as the seat moving mechanism. The forward tilting mechanism is formed by a forward tilting actuator 342 located inside the backrest 334. Upon receipt of a detection signal from the impact sensor 37, the electronic control unit 38 operates the forward tilting actuator 342 to tilt the headrest 335 forward. As a result, the head of the occupant is tilted forward. Thus, the lower air bag member 321A is prevented from interfering with the head of the occupant when the lower air bag member 321A is deployed. Also, only the forward tilting mechanism for the headrest 335 may be employed and the moving mechanism for the seat bottom 333 may be omitted.

Figure 35:
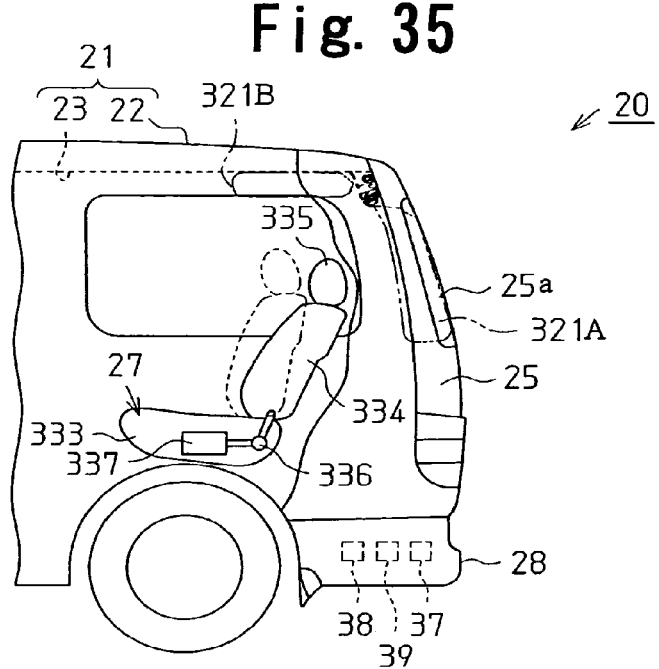
FIG. 35 is a side view illustrating the rear portion of the vehicle according to a sixth embodiment of the present invention.

In each of the modified examples of FIGS. 35 to 36(*b*), a collision predicting sensor 39 (see FIG. 35), which predicts collision from the rear of the vehicle 20, may be provided. The collision predicting sensor 39 functions as a collision determining device or an impact determining device. When predicting a collision based on a signal from the collision predicting sensor 39, the electronic control unit 38 operates the actuator (337, 340, 341, 342). As a result, in the same manner as the cases mentioned above, the lower air bag member 321A is prevented from interfering with the head of the occupant when the lower air bag member 321A is deployed according to the actual collision.

The seat moving mechanisms of FIGS. 35 to 36(*b*) function as a mechanism for restricting the rearward movement of the occupant at a collision. When the impact of the collision is relatively small, the seat moving mechanism alone can protect the occupant from the impact even if an air bag is not mounted to the vehicle 20.

In each of the modified examples of FIGS. 35 to 36(*b*), a belt winding device (not shown), which automatically winds a seat belt, may be located on the rearmost seat 27. The belt winding device may be designed to automatically wind the seat belt when the seat moving mechanism is operated. In this case, the state in which the head of the occupant is moved forward is reliably maintained and the rearward movement of the occupant at a collision is reliably restricted.

In each of the modified examples of FIGS. 35 to 36(*b*), the air bag can be prevented from interfering with the head of the occupant without providing the means for controlling the unfolding direction of the air bag as described in the fifth embodiment of FIGS. 31 and 32.

Furthermore, the embodiments of FIGS. 1 to 36(*b*) can be modified as follows.

In each of the embodiments of FIGS. 1 to 36(*b*), the deployment of the air bag may be started before the actual collision based on the signal from the collision predicting sensor shown in FIG. 35.

In each of the embodiments of FIGS. 1 to 36(*b*), the air bag may be located above the rear door 25 instead of at the rear end of the roof 21. The position of the inflator may be changed in a range where the inflator can supply gas to the air bag in an appropriate manner.

In each of the embodiments of FIGS. 1 to 36(*b*), at least one of the air bag and the inflator may be provided more than one.

Each of the embodiments of FIGS. 1 to 36(*b*) may be combined with one another as required.

The vehicle to which the embodiments of FIGS. 1 to 36(*b*) are provided need not be a minivan or a hatchback, but may be a sedan.

The present examples and embodiments are to be considered as illustrative and not restrictive and the invention is not to be limited to the details given herein, but may be modified within the scope and equivalence of the appended claims.

The invention claimed is:

1. An air bag device for an occupant seated in a rearmost seat of a vehicle, wherein the vehicle has a roof panel, a rear roof rail, which is connected to the roof panel, a roof headlining, which covers the roof panel and the rear roof rail, and a rear window glass, the air bag device comprising:

an air bag, in a folded state, adapted and configured to be accommodated in an upper rear end portion of the vehicle between the rear roof rail and the roof headlining; and an inflator, which supplies gas to the air bag to deploy the air bag, wherein the air bag has a roof side inflation portion and a passenger compartment side inflation portion, wherein the roof side inflation portion is adapted and configured to be inflated between the roof panel and the roof headlining, and wherein the passenger compartment side inflation portion is adapted and configured to be inflated to separate the roof headlining from the rear roof rail and to project toward the passenger compartment from between the rear roof rail and the roof headlining so that the passenger compartment side inflation portion is unfolded downward to be inflated between the rearmost seat and the rear window glass, and wherein at least part of the roof side inflation portion is adapted and configured to be accommodated between the roof panel and the roof headlining, and when not inflated is in an unfolded state forming a substantially planar surface.

2. The air bag device according to claim 1, further comprising an impact determining device configured to determine that an impact has been applied to the vehicle from the rear of the vehicle or that there is a possibility that an impact will be applied to the vehicle from the rear of the vehicle.

3. The air bag device according to claim 1, wherein the roof side inflation portion has at least one securing portion secured to the vehicle.

4. The air bag device according to claim 3, wherein the securing portion is located at an end of the roof side inflation portion, which end extends forward of the vehicle.

5. The air bag device according to claim 3, wherein the securing portion includes a belt.

* * * * *